United States Patent [19]

Hosoe et al.

[11] 4,264,161

[45] Apr. 28, 1981

[54] MOTION DETECTING DEVICE IN EXPOSURE CONTROL SYSTEM FOR OPTICAL INSTRUMENTS

[75] Inventors: Kazuya Hosoe, Machida; Tokuichi Tsunekawa, Yokohama; Makoto Masunaga, Tokyo; Toshio Sakane, Kodaira, all of Japan

[73] Assignee: Canon Kabushiki Kaisha, Tokyo, Japan

[21] Appl. No.: 949,557

[22] Filed: Oct. 10, 1978

[30] Foreign Application Priority Data

Oct. 12, 1977 [JP] Japan .............................. 52-122175
Oct. 12, 1977 [JP] Japan .............................. 52-122177

[51] Int. Cl.³ .......................... G03B 7/083; G01J 1/20
[52] U.S. Cl. .................................. 354/31; 250/203 R; 354/50; 354/60 R
[58] Field of Search ............... 250/203; 358/105, 125; 354/31, 50, 60 R

[56] References Cited

U.S. PATENT DOCUMENTS

| | | | |
|---|---|---|---|
| 3,351,493 | 11/1967 | Weiman et al. | 250/203 R X |
| 3,399,307 | 8/1968 | Levin | 354/37 X |
| 3,532,892 | 10/1970 | Murphy | 250/203 R |
| 3,535,525 | 10/1970 | Minkowitz | 250/203 X |
| 3,693,013 | 9/1972 | Duelser | 358/125 X |
| 3,742,223 | 6/1973 | Carr et al. | 250/203 R X |

*Primary Examiner*—Michael L. Gellner
*Attorney, Agent, or Firm*—Toren, McGeady and Stanger

[57] ABSTRACT

The present invention relates to a motion detecting device for detecting the relative motion rate or velocity between an object and an optical instrument in an exposure control system by which the exposure time, i.e. the shutter speed of the instrument is controlled in response to the relative motion rate or velocity. The motion detecting device is designed to detect the displacement ratio or speed of the position of the center of gravity of the light distribution of the object image on the imaging plane, whereby the danger for misdetection due to the periodical fluctuation of the object brightness can be profitably avoided, being possible to detect only the relative movement between the object and the instrument.

12 Claims, 18 Drawing Figures

MOTION DETECTING DEVICE IN EXPOSURE CONTROL SYSTEM FOR OPTICAL INSTRUMENTS

BACKGROUND OF THE INVENTION

1. Field of the Invention

The present invention relates generally to an exposure control system for camera and other optical instruments, and particularly to a motion detecting device for detecting the relative motion rate or the velocity between an object and the instrument in the exposure control system by which the exposure time, i.e. the shutter speed of the instrument is controlled in response to the relative motion rate or velocity.

2. Description of the Prior Art

Generally, it is well known that the shutter speed of the camera is a very important factor in making an exposure decision. The shutter speed has a close connection with the motion of the object or the camera so that for an object in a quick motion it is necessary to select a quick shutter speed. So far the shutter time has been selected in accordance with the visual measurement of the photographer, which is not perfect. Especially in the case of a camera with an automatic exposure control device, the shutter time is selected independently of the intention of the photographer or the motion of the object so that a good picture cannot always be obtained, and in order to avoid problem, it is necessary to manually alter or modify the preset value, which is problematic.

In order to solve such a problem, an automatic exposure control system for a camera so designed as to detect the relative motion rate or velocity between the object to be photographed and the camera in order to automatically control the exposure time, i.e. the shutter speed in accordance with the detected relative motion rate or velocity has already been proposed by the U.S. Pat. No. 3,399,307 (patented on Aug. 27, 1968 for the invention entitled "Motion Sensing Exposure System for Optical Instruments"). The motion sensing exposure control system proposed by the U.S. Pat. No. 3,399,307 is the one so designed as to obtain a D.C. signal of a level corresponding to the relative motion rate or velocity between the object and the camera. It operates when the object moves with reference to the camera, the camera moves with reference to the object or the camera and the object move with reference to each other. The D.C. signal generated by the movement is used to control the shutter speed and the diaphragm aperture (f-stop).

When the exposure control system of this proposal is employed in front of a photo-electric cell, such as photo resistor arranged to receive the object image from the optical system, a light chopping element, such as grating composed of alternate transparent and opaque areas, is used to sense or detect the motion. A monostable multivibrator, triggered by the output of the photo-electric cell and a time integrator for integrating the output of the monostable multivibrator in accordance with the lapse of time is also employed. When a relative motion occurs between the object and the camera, an A.C. output with a frequency corresponding to the then relative motion rate or speed is then obtained and this output triggers the monostable multivibrator, the output of the monostable multivibrator is then integrated with a time integrator related to the time. A D.C. signal whose level corresponds in frequency to the A.C. output of the photo-electric cell is then obtained, and the level of this D.C. signal corresponds to the relative motion rate or velocity between the object and the camera.

But the use of a grating in front of the photo-electric cell can give rise to misdetection due to periodic or random fluctuation of the object brightness. For example, if the object to be photographed is illuminated with a fluorescent lamp, the object brightness fluctuates due to the illumination with the fluorescent lamp. In this case the photo-electric cell produces an A.C. signal with a frequency corresponding to the fluctuation frequency of the object brightness. Even if there is no relative motion between the object and the camera in this case, the photo-electric cell produces an A.C. signal so that the misdetection takes place due to the flourescent fluctuation of the object brightness. Of course, the above is an extreme example. However, as can be understood from this example, it is clear that misdetection takes place due to nonmotion imposed fluctuation, if any, of the object brightness.

Another problem tends to arise when employing the teachings of U.S. Pat. No. 3,399,307; if the motion detecting device uses photo-resistors as the photo-electric cell. Here the change of the total resistance value of the photo-resistors equals the sum of the changes of the individual resistance values in each image receiving portion. When the object image comprises a comparatively complicated pattern of brightness and darkness, the changes in the resistance values in the image receiving portion cancell each other when the object is in motion. Should this occur, no change in the measured resistance value or only a small change, can take place, thus tending to destroy the ability to detect the relative motion rate or velocity between the object and the camera. Especially, where the object to be photographed has a very complicated pattern, thus making it still more difficult to detect motion using the apparatus described in U.S. Pat. No. 3,399,307.

As explained above, the motion detecting device proposed by U.S. Pat. No. 3,399,307 is fraught with problems needing solution.

SUMMARY OF THE INVENTION

An object of the present invention is to offer an improved and novel motion detecting device always capable of the correct detection of the relative movement between the object and the device despite the fluctuation of the object brightness and regardless of the pattern of the o bject, thus eliminating the inconveniences of the above mentioned detecting device, namely the misdetection due to the fluctuation of the object brightness or the misdetectability due to patterns in the object image.

For this purpose, in accordance with the present invention, a novel motion detecting device is employed, the device evaluating only the position of the center of gravity of the light distribution of the object image. The relative movement between the object and the camera is detected from the displacement of the position of the said center of gravity. With any still object, the center of gravity of the light distribution of the object image is uniquely defined for the object and its pattern of reflection. Further, the center of gravity of the light distribution does not change even if the object brightness changes but changes only when the image is actually displaced. Therefore, pattern effects can be eliminated as a source of incorrect relative motion detection and it is possible to correctly detect only the relative movement between the object and the device. Changes in object brightness, regardless of the pattern of the object image, have no effect, and the inconvenience of the conventional device is completely eliminated.

Another purpose of the present invention is, in connection with the aforementioned feature of the present invention, to offer a more profitable and concrete device for detecting more correctly and accurately changes in the position of the center of gravity of the light amount distribution of the object image.

In connection with this and, in accordance with a preferred embodiment of the present invention, a motion-detecting device is employed having a "Lateral Effect Photodiode" as the photo-electric receiving means. The difference between and the sum of the two currents running through the two terminal electrodes of the lateral effect photodiode are obtained and used to detect the position of the center of gravity of the light distribution of the object image formed on the strip-shaped light sensing surface of the lateral effect photodiode. This is achieved by dividing the difference signal by the sum signal, while the displacement ratio of the position of the center of gravity, namely the output signal corresponding to the relative motion rate or velocity between the object and the device is obtained by means of differentiation. The "Lateral Effect Photodiode" is a new type of photo-electric cell having application in the field of "position sensor". When a spot image is formed just at the center of the strip-shaped light sensing surface of the diode, the two currents running through the two terminal electrodes are equal to each. When the spot image deviates from the center of the above light sensing surface, a difference between the two currents in accordance with the amount of the deviation of the image position from the center occurs. Consequently, it is possible to detect correctly the position of the center of gravity of the light amount distribution of the object image through the use of this lateral effect photodiode. In this embodiment, the difference between the two currents is divided by their sum. This in effect normalizes the difference signal using the object brightness as represented by the sum of the two currents. Its effect is to completely eliminate the undesirable influence due to the fluctuation of the object brightness, thus insuring that only the displacement of the position of the center of gravity of the light distribution of the object image is detected, and detected with a remarkable accuracy. Further, in case of this embodiment, two lateral effect photodiodes, one for the horizontal detection and the other for vertical detection are provided, and the output of the circuit for horizontal detection is added to that of the circuit for vertical detection, In essence the idea of so-called "vector composition". Thus, the relative motion rate or velocity not only along the horizontal and the vertical direction but also along any direction can be detected.

In a variation of this embodiment, instead of the above lateral effect photodiode, two pairs of conventional photodiodes are arranged at a certain determined distance from each other. The two diodes constituting a pair are arranged as close to each other as possible. The output currents of the two diodes in the one pair are added to each other while the difference between the output currents of the two diodes in the other pair are obtained and the difference signal is divided by the sum signal and then differentiated so as to detect the displacement ratio or velocity of the position of the center of gravity. In this way, the same effect as is obtained by means of lateral effect photodiodes can be achieved without making use of lateral effect photodiodes.

Further, in this variation the difference between the output currents of the two diodes in the one pair is divided by the sum of the output currents of the two diodes in the other pair, thus normalizing the signal based on the object brightness in the same ways as in the case of the above. Also in this variation, 4 photodiodes are made to constitute one set, and the one set is intended for the horizontal detection while another set is intended for vertical detection. The sum of the output currents of the horizontal detection circuit and the output currents of the vertical detection circuit is obtained, and detection of the relative motion rate or velocity along any direction is obtained in the same way as in the above embodiment.

In one application of this variation, a plural number of the sets, each consisting of altogether eight photodiodes, are distributed on the imaging plane. The output of the detecting circuit for each set is added with different "weight" and then the weighted sum of the outputs is obtained. In this way the movement of the object image can be evaluated with the movement of each image portion on the imaging plane taken into consideration, which is the rational approach to the problem for an instrument such as camera in which the image of the main object is very often positioned at the center of the imaging plane.

On the other hand, as another method for detecting the movement of the position of the center of gravity of the light distribution of the object image in accordance with another embodiment of the present invention, the output signal of each of a plurality of photo-sensors is obtained by scanning the object using an area type or line type photo-sensor array, also known as a self-scan type image sensor. The photo-electric means, with individual scanning signals corresponding to each fine image element constituting the object image, is given a different "weight" corresponding to the location address of the sensor in the above array. The sum of the weighted outputs is obtained and divided by the then total sum of the output signals of the photo-sensors so as to obtain the position of the center of gravity of the light amount distribution of the object image. The difference between the data just obtained and the previous data used in the same way is obtained to obtain the displacement ratio or velocity of the position of the center of gravity. Namely, the method to obtain the position of the center of the light distribution of the object image corresponds to that used to obtain the center of mass, namely the center of gravity of an object having a weight. In this way, it is possible to obtain the position of the center of gravity of the light distribution of the object image precisely.

In accordance with still further variation, the "normalization" by means of the object brightness is automatically carried out during the "division" process by means of the object brightness at the detected position of the center of gravity of the light distribution of the object image.

A still further purpose of the present invention is to offer a more practical and profitable device for controlling the exposure time in accordance with the output of the motion detectiong device.

In connection with the above purpose and in accordance with the embodiments described above, a more profitable embodiment of the exposure control system for comparing the exposure time obtained in accordance with the output of the motion detecting device with the exposure time preset by the photographer (camera user) may be employed in order to select the shorter exposure time.

A still further purpose of the present invention is to offer a more rational device for automatically controlling the exposure of a camera, employing an exposure control system having a motion detecting device in accordance with the present invention.

In connection with the above purpose, and in accordance with the embodiment in which photo-sensor arrays are used, the object brightness is obtained from the outputs of photo-sensor arrays so as to automatically control the exposure aperture in accordance with the thus obtained object brightness, the film speed and the exposure time determined as aforementioned.

Another purpose of the present invention is to offer a complete automatic camera and other optical instrument by providing the motion detecting automatic exposure control system as mentioned above.

In connection with the above purpose in accordance with another embodiment of the present invention, the camera and the other optical instrument are made more profitable by enabling automatic focus detection or control of the instrument by means of the output of the photo-sensor array at the same time.

Further purposes and features of the present invention will become apparent from the ensuing description of the embodiments shown in the accompanying drawings.

BRIEF DESCRIPTION OF THE DRAWINGS

The preferred embodiments in accordance with the present invention will be explained in accordance with the accompanying drawings.

DETAILED DESCRIPTION OF THE PREFERRED EMBODIMENTS

First of all, in accordance with FIGS. 1–5, the first embodiment of the present invention will be explained. This embodiment employs a "lateral effect photodiode" as the photo-electric means for receiving an object image formed by an image forming optical system.

Figure 1:
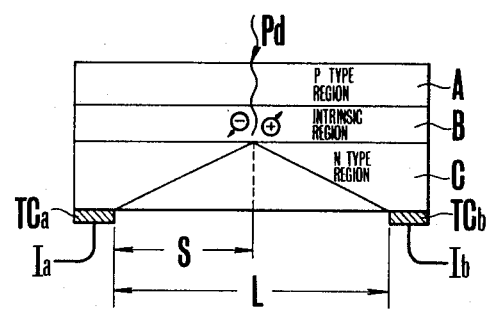
FIG. 1 shows the principal construction of the lateral effect photodiode used in the first embodiment of the present invention.

As is shown in FIG. 1, a representative lateral effect photodiode is principally constructed in such a manner that the intrinsic region B is sandwiched between the P-type region A and N-type region C, while at the right and the left surface of the N-type region C the terminal electrodes TCa and TCb are formed. The current Ia generated in terminal electrode TCa by a light beam Pd is determined by the distance of the incident beam from the terminal. For example, with Pd incident at a distance S from the left terminal electrode TCa, the current generated in electrode TCa is $Ia = Io \cdot (S/L)$, whereby L represents the distance between the right and the left terminal electrodes TCa and TCb, Io represents the current photo-induced by the light Pd.

On the other hand, the current running through the right terminal electrode TCb at this time is represented by $Ib = Io \cdot L - S/L$. Thus, the difference $I\delta$ between the two currents Ia and Ib running through the terminal electrodes TCa and TCb respectively represents the amount of the deviation of the position of light beam Pd from the position in the P-type region A at which $Ia = Ib$, namely $S = L/2$. By obtaining the difference, $I\delta$ between, the two currents Ia, Ib running through the terminal electrodes TCa and TCb respectively, the position of the weighted center of the light distribution of the object image can be detected as the distance from the central position in the strip-shaped light sensing plane of the lateral effect photodiode. The ratio or the speed of deviation of the center of the light distribution occasioned by an image in relative motion with respect to the light sensing plane of the lateral effect photodiode can be detected by differentiating the difference $I\delta$.

Further, the sum Is of the above two currents Ia and Ib corresponds to the photo-induced current Io and further corresponds to the intensity of the incident light beam Pd. The current difference $I\delta$ can be "normalized" with the intensity of the incident light Pd by dividing the current difference $I\delta$ by the current sum Is in such a manner that the undesirable influence due to the fluctuation of the object brightness can completely be eliminated so as to be able to detect the position of the center of gravity of the light distribution of the object image.

Figure 2:
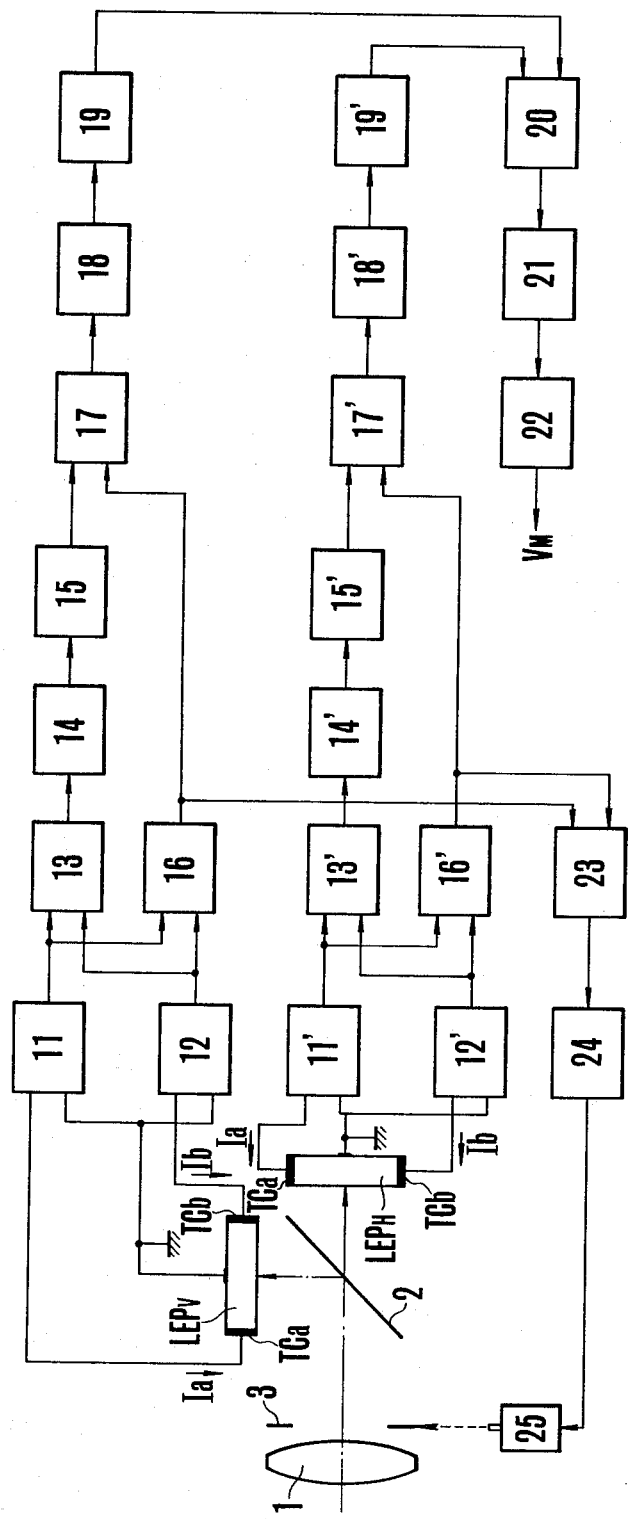
FIG. 2 is a block diagram for showing the composition of the first embodiment in accordance with the present invention.

FIG. 2 shows the first embodiment of the present invention, whereby motion detection is carried out by making use of the lateral effect photodiode as explained above.

In the drawing, $LEP_V$ and $LEP_H$ represent lateral effect photodiodes having the above described composition and characteristics, whereby they are arranged at the position corresponding to the imaging plane of the image forming lens 1 so as to receive the image light split by means of the beam splitter 2. Here, the lateral effect photodiode $LEP_V$ is intended to detect the movement of the object image formed by the lens 1 along the vertical direction, while the lateral effect photodiode $LEP_H$ is intended to detect the movement of the object image formed by the lens 1 along the horizontal direction. The lateral effect photodiode $LEP_V$ for detecting vertical motion is arranged so as to be orthogonal to the lateral effect photodiode $LEP_H$, namely vertically to the plane of FIG. 2. Numeral 3 is the diaphragm for controlling the amount of light incident on the lateral effect photodiodes $LEP_V$ and $LEP_H$.

Figure 4:
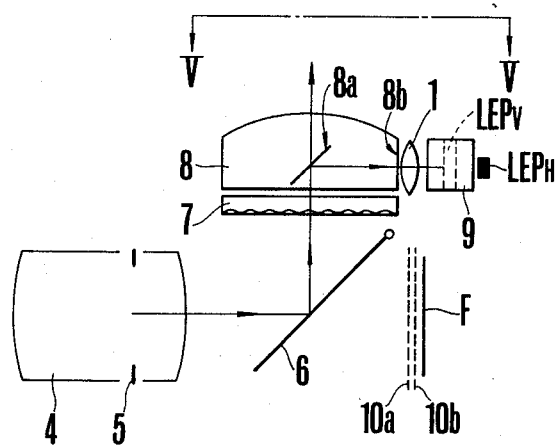
FIG. 4 shows the optical arrangement of the single lens reflex camera in which the first embodiment of the present invention is placed.
Figure 5:
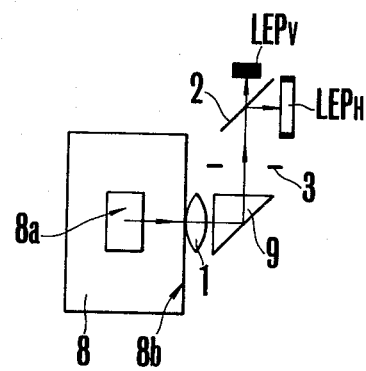
FIG. 5 is the view along the direction V—V of FIG. 4.

The optical arrangement mentioned above will be explained in accordance with a concrete embodiment, specifically a single lens reflex camera. Refer to FIGS. 4 and 5. As shown in the drawing, a half-transparent mirror part 8a is placed at the center of the condenser lens 8 arranged above the focussing screen 7. A part of the image light from the focussing screen 7 is taken out from the end surface 8b of the condenser lens 8, while by arranging the above an image forming lens, 1 so as to face to the end surface 8b as image reforming lens the image is led through the reflecting prism 9 and the diaphragm 3 to the beam splitter 2 arranged at an angle behind the condenser lens 8. The beam is split into two light beams to be received respectively by the lateral effect photodiodes $LEP_V$ and $LEP_H$. In FIG. 4, numeral 4 denotes the object lens, 5 the photographing aperture, 6 the conventional viewing mirror rotatable around the shaft 6a, numerals 10a and 10b denote respectively the first and the second curtains of a conventional focal plane shutter, and F denotes the film.

In FIG. 2, two linear amplifier circuits 11 and 12 linearly amplify the current Ia and Ib passing through the terminal electrodes TCa and TCb of the lateral effect photodiode $LEP_V$ for detecting the vertical displacement. A differential circuit 13 serves for obtaining the difference of the outputs of the amplifying circuits 11 and 12 respectively ($I\delta = Ia - Ib$). The output of the differential circuit 13 is logarithmically compressed by a logarithmically compressing circuit 14 and converted into an absolute value $\log|I\delta|$ by an absolute value circuit 15 and then led to a differential circuit 17. Numeral 16 denotes is the logarithmically compressing and adding circuit for logarithmically compressing and adding the outputs of the amplifying circuits 11 and 12 so as to obtain log Is ($=\log(Ia+Ib)$), whereby the output is applied to the above differential circuit 17. Thus the differential circuit 17 delivers a voltage corresponding to $\log|I\delta| - \log Is$, namely $|I\delta|/Is$. This means that $|I\delta|$ ($=|Ia-Ib|$), namely the deviation of the position of the weighted center, of the distribution of light amount of the object image formed on the strip-shaped light sensing plane of the lateral effect photodiode $LEP_V$ from the center of the light sensing plane of the lateral effect photodiode $LEP_V$ is "normalized" by Is ($=Ia+Ib$), the object brightness. In this way, it is possible to obtain from the differential circuit 17 only the signal correctly corresponding to the position along the vertical direction of the center of light distribution of the object image, in spite of the object brightness.

The output of the differential circuit 17 is applied to the differentiating circuit 18, in which the speed of the image center is detected. Now let us suppose that the object image completely stands still on the light sensing plane of the lateral effect photodiode $LEP_V$. The output of the differential circuit 17 remains absolutely unchanged. Consequently, the output of the differentiating circuit 18 is zero. On the other hand, when the object image moves on the light sensing circuit of the lateral effect photodiode $LEP_V$, the output of the differential circuit 17 varies according to the movement, and the differentiating circuit 18 produces a signal corresponding to the speed of change in the ratio of the output of the differential circuit 17, namely the displacement ratio or speed of the object image along the vertical direction. The output of the differentiating circuit 18 is then delivered to the absolute value circuit 19, in which the absolute value is obtained. Thus, as can be understood from the above explanation, the output of the absolute value circuit 19 represents the displacement ratio or speed of the object image along the vertical direction.

The foregoing explains the structure of the vertical displacement detecting circuit provided for the vertical displacement detecting lateral effect photodiode $LEP_V$.

On the other hand, the horizontal displacement detecting circuit for the horizontal displacement detecting lateral effect photodiode $LEP_H$ is composed of the same elements as the circuit described above for the $LEP_V$. In FIG. 2, the circuit blocks 11'-19' correspond to blocks 11-19 explained above, having the same structure. Thus, the output of the last circuit block, namely the absolute value circuit 19' in the horizontal displacement detecting blocks 11'-19' represents the displacement ratio or speed of the object image along the horizontal direction.

Numeral 20 denotes is the adding circuit for obtaining the outputs of the two absolute value circuits 19 and 19', 21 the peak holding circuit for holding the peak value of the output of the adding circuit 20, and a buffer circuit 22 is used as an output circuit, whereby the displacement ratio or speed of the object image along any direction is shown with the output $V_M$ of the buffer circuit 22.

Further, numeral 23 denotes is the adding circuit for obtaining the sum of the outputs of the above mentioned two logarithmically compressing and adding circuits 16 and 16', and a meter control circuit 24 controls the meter 25 for driving the diaphragm 3, whereby they serve to avoid the saturation of the linear amplifying circuit 11, 12, 11' and 12' by controlling the amount of the light incident on the lateral effect photodiodes $LEP_V$ and $LEP_H$.

In the first embodiment of the present invention the relative motion rate or velocity between the object and the device along any direction is detected as explained above. Now the circuit blocks 11-23 in the circuit shown in FIG. 2 will be explained in detail in accordance with FIG. 3.

Figure 3:
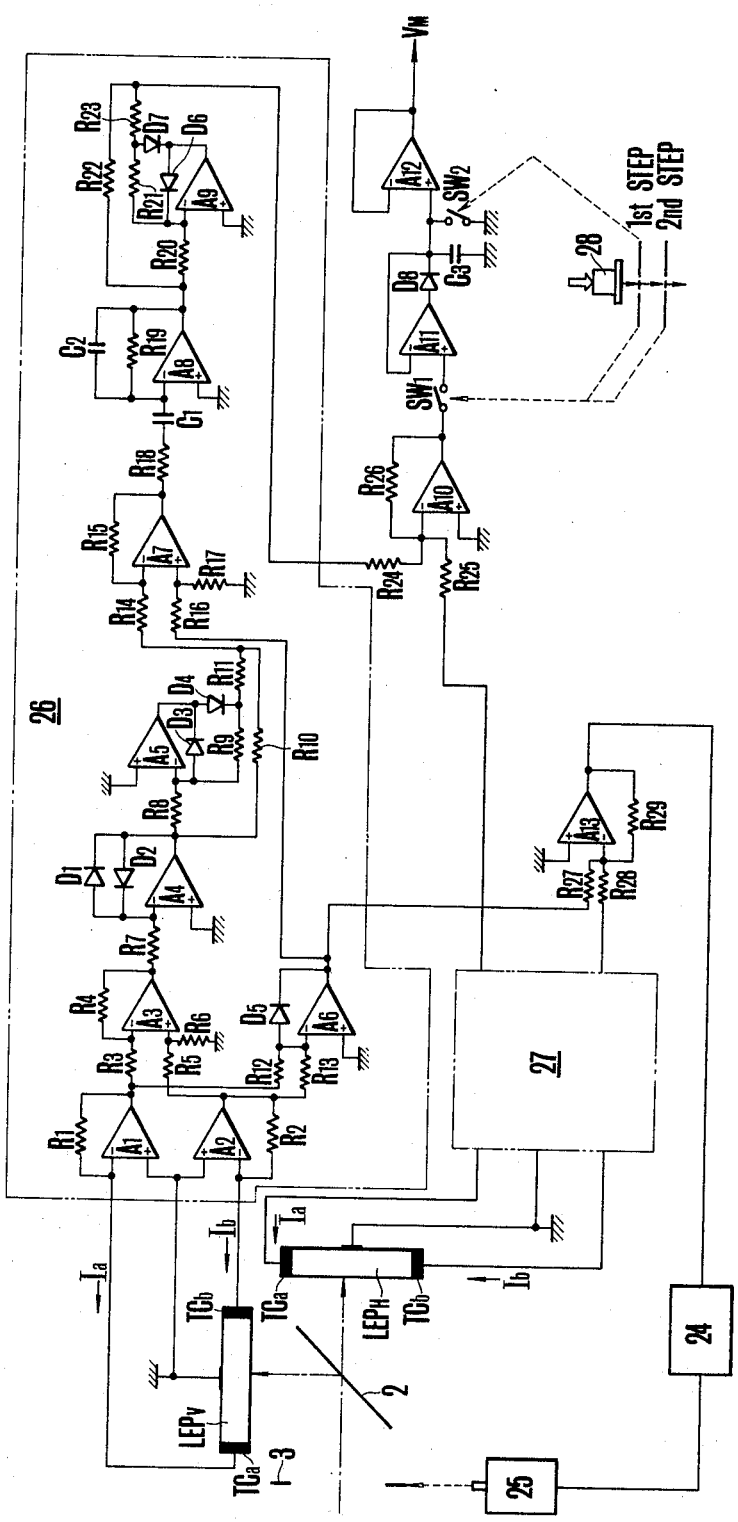
FIG. 3 is a circuit diagram for showing the detailed composition of the circuit of the first embodiment shown in FIG. 2.

In FIG. 3, the circuit 26 corresponds to the vertical displacement detecting circuit including the circuit blocks 11-19 in FIG. 2. In the circuit 26, the circuitry consisting of the operational amplifier A1 and the resistance R1 represents the means for linearly amplifying the current Ia running through the terminal electrode TCa of the vertical displacement detecting lateral effect photodiode $LEP_V$, and corresponds to the above linear amplifying circuit 11. Also the circuitry consisting of the operational amplifier A2 and the resistance R2 represents the means for linearly amplifying the current Ib running through the other terminal electrode TCb of the lateral effect photodiode $LEP_V$, corresponding to the above linear amplifying circuit 12. The circuitry consisting of the operational amplifier A3 and the resistance R3, R4, R5 and R6 represents the means for obtaining the difference between the outputs of the operational amplifiers A1 and A2, corresponding to the afore mentioned differential circuit 13. The circuitry consisting of the operational amplifier A4, the resistance R7 and the diodes D1, D2 represents the means for logarithmically compressing and amplifying the output of the above mentioned operational amplifier A3, corresponding to the above mentioned logarithmic compressing circuit 14. The circuitry consisting of the operational amplifier A5, the resistances R8, R9, R10 and R11 and the diodes D3 and D4 represent the means for obtaining the absolute value of the output of the above mentioned amplifier A4, corresponding to the above mentioned absolute value circuit 15. The circuitry consisting of the operational amplifier A6, the resistances R12, R13 and the diode D5 represents the means for logarithmically compressing and adding the outputs of the above mentioned operational amplifiers A1 and A2, corresponding to the above mentioned logarithmic compressing and adding circuit 16. The circuitry consisting of the operational amplifier A7 and the resistances R14, R15, R16 and R17 represents the means for subtracting the output of the above mentioned operational amplifier A6, corresponding to the above mentioned differential circuit 17. The circuitry consisting of the operational amplifier A8, the resistances R18 and R19 and the condensers C1 and C2 represents the means for differentiating the output of the operational amplifier A7, corresponding to the above mentioned differentiating circuit 18. Lastly the circuitry consisting of the operational amplifier A9, the resistances R20, R21, R22 and R23 and the diodes D6 and D7 represents the means for obtaining the absolute value of the output of the above mentioned operational amplifier A8, corresponding to the above mentioned absolute value circuit 19.

The circuit denoted by the numeral 27 as a whole corresponds to the horizontal displacement detecting circuit including the circuit block 11'-19' in FIG. 2. As set forth earlier, the circuit for horizontal displacement detection is composed in the same way as the above mentioned vertical displacement detecting circuit 26. Thus, the drawing for the circuit is omitted here.

The circuitry consisting of the operational amplifier A10 and the resistances R24, R25 and R26 represents the means adding the output of the operational amplifier A9 in the above mentioned vertical displacement detecting circuit 26 to the output of the operational amplifier constituting the above mentioned absolute value circuit 19' in the horizontal displacement detecting circuit 27, and it corresponds to the above mentioned adding circuit 20. The circuitry consisting of the operational amplifier A11, the diode D8, the condenser C3 and the normally open switches SW1 and SW2 represents the means for holding the peak value of the output of the above mentioned operational circuit A11, corresponding to the above mentioned peak hold circuit 21. In this circuitry, the switch SW1 is the input control switch for the output of the above mentioned operational circuit A10, while the switch SW2 is the clear switch for clearing the value memorized in the condenser C3. These switches SW1 and SW2 are operatively engaged with, for example, the camera release button 28 of the two stroke release type in such a manner that along with the first stroke of the release button 28 the clear switch SW2 is closed for a moment (so as to clear the value memorized in the condenser C3) and opened again, and then the input control switch SW1 is closed (so as to hold the peak value of the output of the above operational amplifier A10 by means of the condenser C3), while along with the second stroke of the release button 28 the switch SW1 is opened. In this case, the above mentioned release button 28 is mechanically so designed that no matter how quickly one tries to operate it, there always exists a time lag of at least several tens of multiseconds between the first stroke and the second stroke.

The operational amplifier A12 is the buffer amplifier, corresponding to the above mentioned buffer circuit 22 and intended to produce the above mentioned signal $V_M$ representing the relative displacement ratio or velocity of the object image along any direction.

The circuitry consisting of the operational amplifier A13 and the resistances R27, R28 and R29 represents the means for adding the output of the operational amplifier A6 in the above mentioned vertical displacement detecting circuit 26 to the output of the operational amplifier constituting the above mentioned logarithmically compressing and adding circuit 16' similar to that in the above mentioned horizontal displacement detecting circuit 27. The unit corresponds to the above mentioned adding circuit 23, whereby the operational amplifier A13 delivers the output to the above mentioned control circuit 24.

Below, a variation of the first embodiment will be explained in accordance with FIGS. 6 to 8. In this variation, eight photodiodes are used instead of the lateral effect photodiodes $LEP_V$ and $LEP_H$, whereby the same effect is obtained when the lateral effect photodiodes $LEP_V$ and $LEP_H$ are used.

Figure 6:
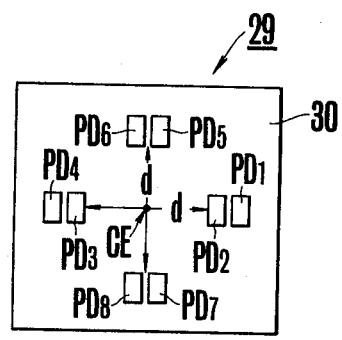
FIG. 6 shows the general composition of the photoelectric means adopted in a variation of the first embodiment.

FIG. 6 shows an outline of the composition of the photoelectric device used in the variation, whereby this photoelectric device is denoted by numeral 29 as a unit. The device presents eight photodiodes PD1-PD8 arranged as shown in the drawing. Namely, the photodiodes PD1 and PD2, PD3 and PD4, PD5 and PD6, and PD7 and PD8 are arranged in pairs close to each other, whereby the photodiode pair PD1 and PD2 and pair PD3 and PD4 are arranged on the base plate 30 with the distance d between them along the horizontal direction, while the photodiode pair PD5 and PD6 and pair PD7 and PD8 are arranged on the base plate 30 with the distance d between them along the vertical direction. Consequently, the photodiode pair PD1-PD4 is intended to detect the horizontal displacement of the object image, while the photodiode pair PD5-PD8 is intended to detect the vertical displacement of the object image. The above mentioned distance d is chosen so as to be 3-4 mm in case the size of each photodiode is for example 1 mm×2 mm.

Figure 7:
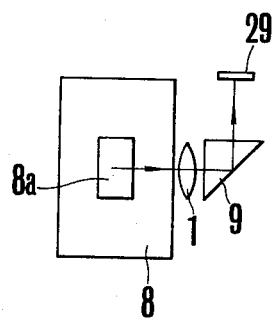
FIG. 7 shows an embodiment of the positions at which the above mentioned photo-electric means are arranged when the above variation is built in a single lens reflex camera.

In a single lens reflex camera, it is possible to arrange the above photoelectric device 29 shown in FIG. 7. In essence, the internal camera arrangement is the same as shown in FIG. 5 for LEP's, except that the photoelectric device 29 is used in place of the lateral effect photodiodes $LEP_V$ and $LEP_H$ and the beam splitter 2.

In the embodiment of FIGS. 6 and 7, let us suppose that the object image is formed on the phtoelectric device 29 by means of the image forming lens 1. The output current of the photodiodes PD1-PD8 at this time represents the brightness of that portion of the image incident on the photoelectrodes. Thus, for example, the difference $I\delta$ between the output currents of the photodiodes PD1 and PD3 represents the difference between the brightness at two image portions distant by d from each other along the horizontal direction. On the other hand, the difference $I\delta$ can be considered to represent the amount of deviation of the position of the center of gravity of the light distribution of the object image from the center CE (FIG. 6) of the photoelectric device 29. Thus, the difference $I\delta$ is "normalized" with the object brightness, when the difference $I\delta$ is divided with the sum Is of the output currents of the photodiodes PD2 and PD4. It is therefore possible to obtain data for locating the position of the center of gravity of the light distribution of the object image along the horizontal direction completely free from the influence due to the fluctuation of the object brightness.

Also in case of the photodiodes PD5-PD8, the data of the position of the center of gravity of the light distribution of the object image along the vertical direction completely free from the influence due to the fluctuation of the object brightness can be obtained, when the difference $I\delta$ between the output currents of the photodiodes PD5 and PD7 is divided by the sum Is of the output currents of the photodiodes PD6 and PD8.

Motion detection in this variation is carried out as explained above.

The circuit of the using the photoelectric device 29 will be explained in accordance with FIG. 8.

In the drawing, the circuit denoted by the numeral 30 as a whole is the horizontal displacement detecting circuit for the photodiodes PD1-PD4 in the photoelectric device 29. In the circuit 30, the circuitry consisting of the operational amplifier A14 and the diodes D9 and D10 is used for obtaining the difference $I\delta$ between the output currents of the photodiodes PD1 and PD3, whereby the photodiodes PD1 and PD3 are in inverse relationship to each other connected in parallel with two input terminals of the operation amplifier A14. The output of the operational amplifier A14 is normalized by means of the circuitry consisting of the operational amplifier A5, the resistances R8-R11 and diodes D3 and D4 in a manner similar to the absolute value circuit 15 or 15′ in the circuit shown in FIG. 2, so as to obtain log $|I\delta|$. The circuitry consisting of the operational amplifier A15 and the diode D11 are used to obtain the sum Is of the output currents of the photodiodes PD2 and PD4 in a logarithmically compressed form, namely log Is, and the photodiodes PD2 and PD4 are connected in parallel with the two input terminals of the operational amplifier A15 along the forward direction. This circuitry corresponds to the logarithmically compressing and adding circuit 16 or 16′ in the circuit shown in FIG. 2. The output of the above mentioned operational amplifier A15 is delivered to a circuit consisting of the operational amplifier 47 and the resistances R14-R17 in the same way as in the case of the differential circuits 17 or 17′ in the circuit shown in FIG. 2, together with the output of the above mentioned operational amplifier A5. Consequently, in the same way as in case of the first embodiment, the above mentioned amplifier A7 delivers a voltage corresponding to log$|I\delta|$-log Is, namely $|I\delta|$/Is, which represents the amount of the deviation of the position of the center of gravity of the light distribution of the object image formed on the photoelectric device 29 along the horizontal direction from the center CE (FIG. 6) of the photoelectric device 29. The value is thus "normalized" by means of the object brightness (Is), so that it is possible to express only the position of the center of the light distribution completely free from influences due to the fluctuation of object brightness.

The output of the above operational amplifier A7 is delivered to the circuit consisting of the operational amplifier A8, the resistances R18 and R19 and the condensers C1 and C2 in the same manner as the differentiating circuit 18 or 18′ in the circuit shown in FIG. 2, so as to obtain a variation ratio, while the absolute value of the output of the operational amplifier A8 is obtained with the circuit consisting of the operational amplifier A9, the resistances R20-R23 and the diode D6 and D7 similar to the absolute value circuits 19 or 19′ in the circuit shown in FIG. 2. The above mentioned operational amplifier A9 delivers a signal corresponding to the displacement ratio or velocity of the object image along the horizontal direction.

The circuit denoted by the numeral 31 is the vertical displacement detecting circuit provided for the photodiodes PD5-PD8 in the photoelectric device 29. This circuit is the same as the horizontal displacement circuit 30 so that the drawing for the circuit is omitted.

In the aforementioned structure, the circuits 30 and 31 deliver signals corresponding to the displacement ratio or velocity of the object image along the horizontal and vertical directions respectively. These two signals are added to each other by a circuit composed of the operational amplifier A10 and the resistances R24-R26 in the same way as the adding circuit 20 in FIG. 2 so that the operational amplifier A10 delivers a signal representing the displacement ratio or velocity of the object image along any direction. The output of the operational amplifier A10 is delivered to the circuitry composed of the operational amplifier A11, the diode D8, the capacitor C3 and the switches SW1 and SW2 in the same way as the peak hold circuit 21 in the circuit in FIG. 2. In which circuitry the peak value is held (in the capacitor C3) and then delivered through the buffer amplifier A12 corresponding to the buffer circuit 22 of FIG. 2. Hence the output $V_M$ of the buffer amplifier A12 indicates the displacement ratio or velocity of the object image in any direction.

Figure 8:
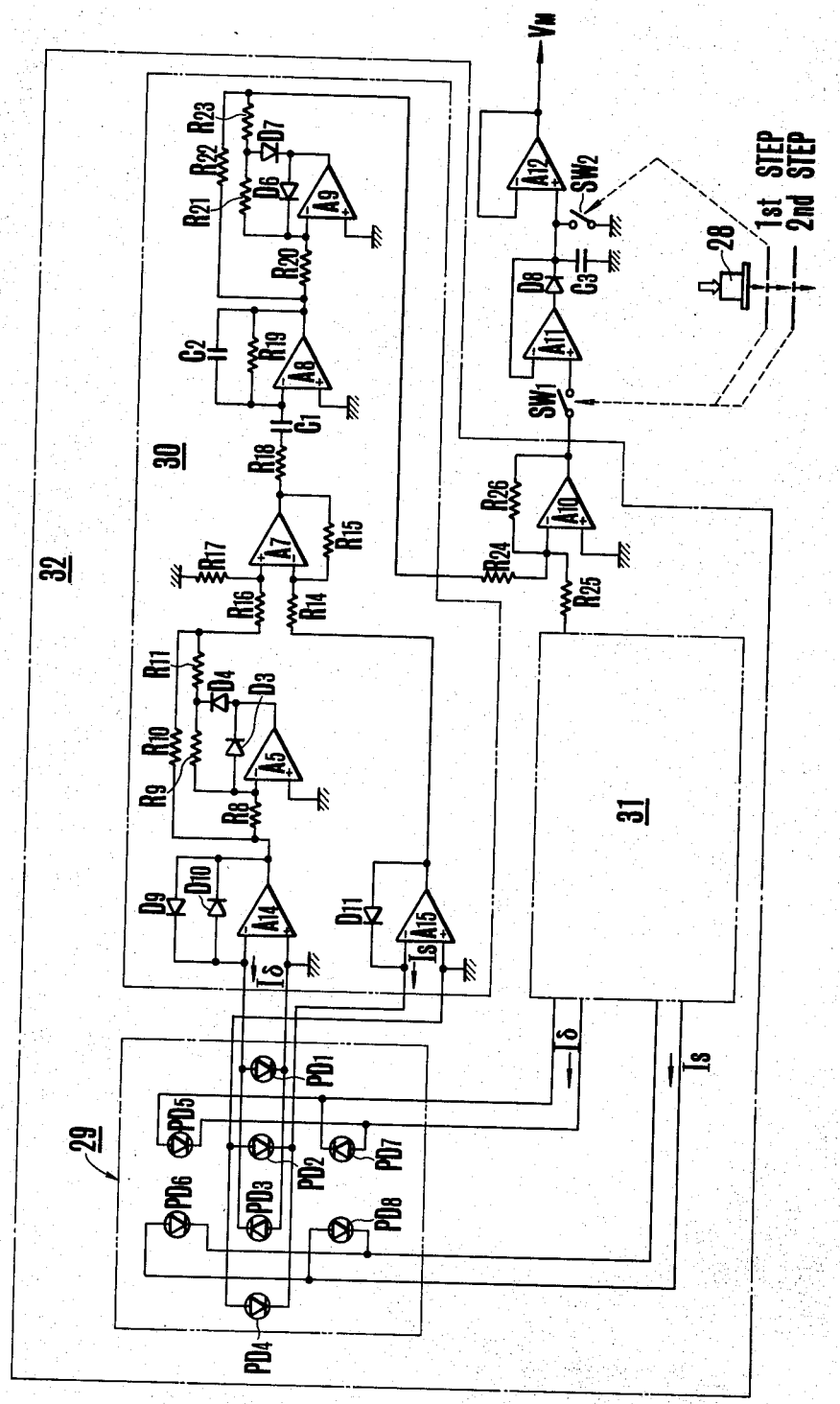
FIG. 8 is a circuit diagram showing the detailed composition of the circuit in the variation of FIG. 6.

As explained, the embodiment of FIGS. 6 to 8, instead of using the lateral effect photodiodes $LEP_V$ and $LEP_H$ of the first embodiment, uses the photoelectric device 29 shown in FIG. 6 to obtain the same effect as the first embodiment.

Below, an application of the variation so far explained will be explained in accordance with FIG. 9. In case of this application, the image plane is divided into a plural number of the sub-planes, in each of which sub-planes the motion detecting is carried out by means of the detecting system shown with 32. After different "weight" has been given to output of each detecting system, the outputs are added altogether so as to estimate the displacement ratio or velocity of the object image as a whole, the individual displacement ratio or velocity of the image portion in each sub-plane being taken into consideration.

Figure 9:
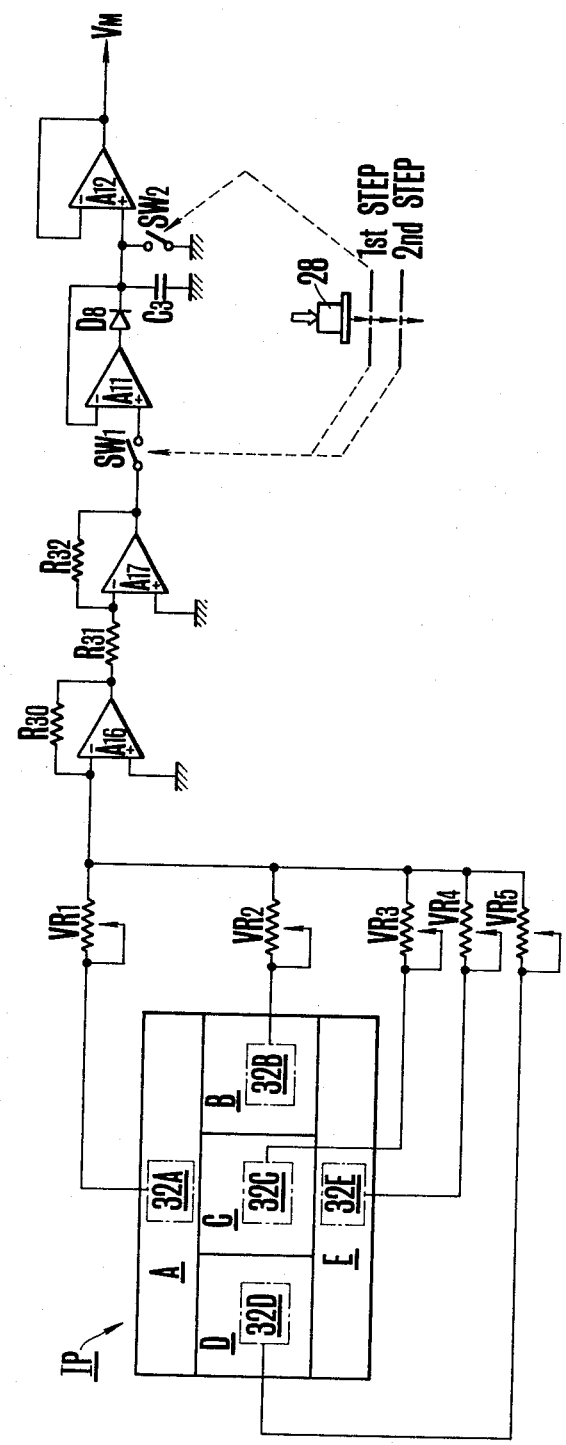
FIG. 9 is a circuit diagram for showing the detailed composition of an application for the above variation of FIG. 6.

In FIG. 9, the imaging plane IP of the image forming lens 1 is divided into five sub-planes A, B, C, D and E. Five detecting systems 32A, 32B, 32C, 32D and 32E each having the same structure and operation as the detecting system 32 independently direct the displacement ratio or velocity of the image portion in each sub-plane. After a different "weight" has being given to the output of each detecting system 32A–32E by adjusting resistances VR1, VR2, VR3, VR4 and VR5, the outputs are added by an adding circuit composed of an operational amplifier A16 and a resistance R30. The output of the adding circuit, namely the operational amplifier A16 is inverted and amplified by the inverting amplifying circuit composed of an operational amplifier A17 and the resistances R31 and R32. It is then delivered to the peak hold circuit (21 in FIG. 2) consisting of the operational amplifier A11, a diode D8, a capacitor C3 and switches SW1 and SW2 so that the peak value is held and delivered as the signal $V_M$ through a buffer amplifier A12. Consequently, the output $V_M$ of the buffer amplifier A12 indicates the displacement ratio or velocity of the object image as a whole. Hence the individual displacement ratio or velocity of the image portion in the sub-planes A–E of the imaging plane IP are taken into consideration.

The "weight" is statistically determined and made largest at the center of the imaging plane IP. Hence the sub-plane C is weighted most heavily. This is reasonable for the equipment like a camera where the image of the principal object is most often situated at the center of the imaging plane.

Figure 10:
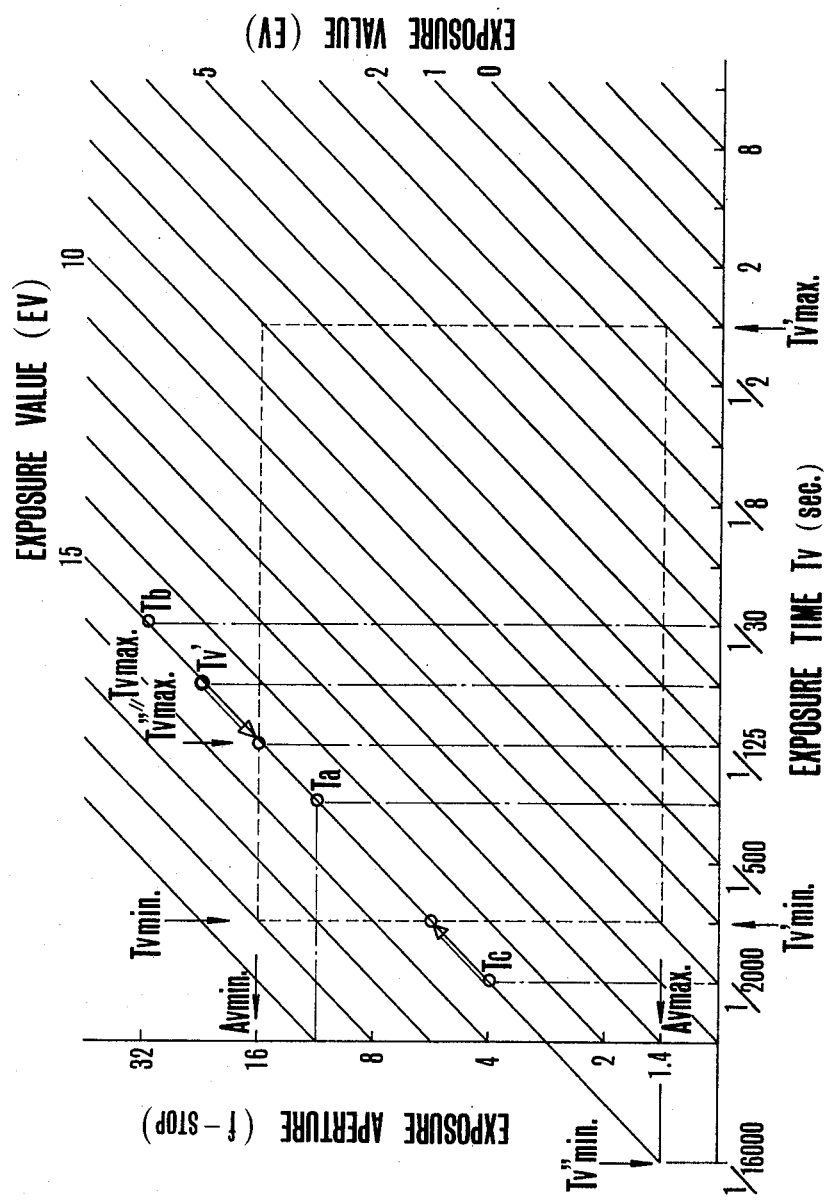
FIG. 10 is a chart for explaining a method for deciding the exposure time where the exposure time of a camera is controlled by means of the output of the motion detecting device in accordance with the present invention.

The chart in FIG. 10 illustrates a method of used in an automatic exposure control of the present invention. Now, let us suppose that the camera in question uses a lens with a maximum exposure aperture value f1.4 and a minimum exposure aperture value f16 and a shutter with the minimum exposure time 1/1000 sec. and the maximum exposure time 1 sec.

Let us suppose that the light value of the object to be photographed is now for example EV15. At first the minimum exposure time $Tv''min(=1/16000$ sec.) for obtaining the proper exposure and the maximum exposure time $Tv''max(=1/125$ sec.) are calculated respectively based upon the maximum exposure aperture value Avo (f1.4), the minimum exposure aperture value Av min. (f16) given by the lens and the assumed light value EV15. Then the exposure time $Tv'min(=1/1000$ sec.) and the maximum exposure time $Tv'max(=1$ sec.) of the shutter is now compared. The calculation results in $Tv''min-Tv''max$, so within the shutter-aperture range in the dotted line in FIG. 10, the comparison determines the minimum exposure time Tv min $(=1/1000$ sec.) and the maximum exposure time Tv max $(=1/125$ sec.) for EV15.

On the other hand, now let us suppose that the exposure time preselected by the photographer is Tv' and the exposure time determined to obtain a sharply focused image of the moving object basing upon the output $V_M$ of the motion detecting devide be $Tv_M$. If $Tv_M<Tv'$, $Tv_M$ is selected, while if $Tv_M>Tv'$, Tv' is selected.

Thus, the selected valve $Tv_M$ or Tv' is compared with the afore mentioned exposure time range Tv min $(=1/1000$ sec.) - Tv max $(=1/125$ sec.) in order to determine whether $Tv_M-Tv'$ is within the time range Tv min-Tv max. If the selected $Tv_M$ or Tv' is within the range Tv min-Tv max, $Tv_M$ or Tv' is used as the exposure time Tv of the camera. On the other hand, when the selected value $Tv_M$ or Tv' is longer than Tv max the value Tv max is adopted, while when $Tv_M$ or Tv' is shorter than Tv min the Tv min is used as exposure time T.

Now let us suppose that $Tv'=1/60$ sec. while $Tv_M=Ta=1/250$ sec. In this case $Tv_M<Tv'$ and Tv max $(=1/125$ sec$)>Tv_M>Tv$ min $(=1/1000$ sec.) so that $Tv_M$ is adopted as exposure time Tv. The exposure aperture is set to f11.

On the other hand, when $Tv_M=Tb=1/30$ sec. $Tv_M>Tv'$ so that Tv' is to be selected. However, $Tv'>Tv$ max $(=1/125$ sec.) so that Tv max is used as the exposure time Tv. Here, the exposure aperture is set to f16.

Now let us suppose that $Tv_M=Tc=1/2000$ sec. In this case $Tv_M<Tv'$ so that $Tv_M$ is to be selected. However, at this time $Tv_M<Tv$ min $(=1/1000$ sec.) so that Tv min is adopted as exposure time Tv. Here, the exposure aperture is set to f1.4.

Figure 11:
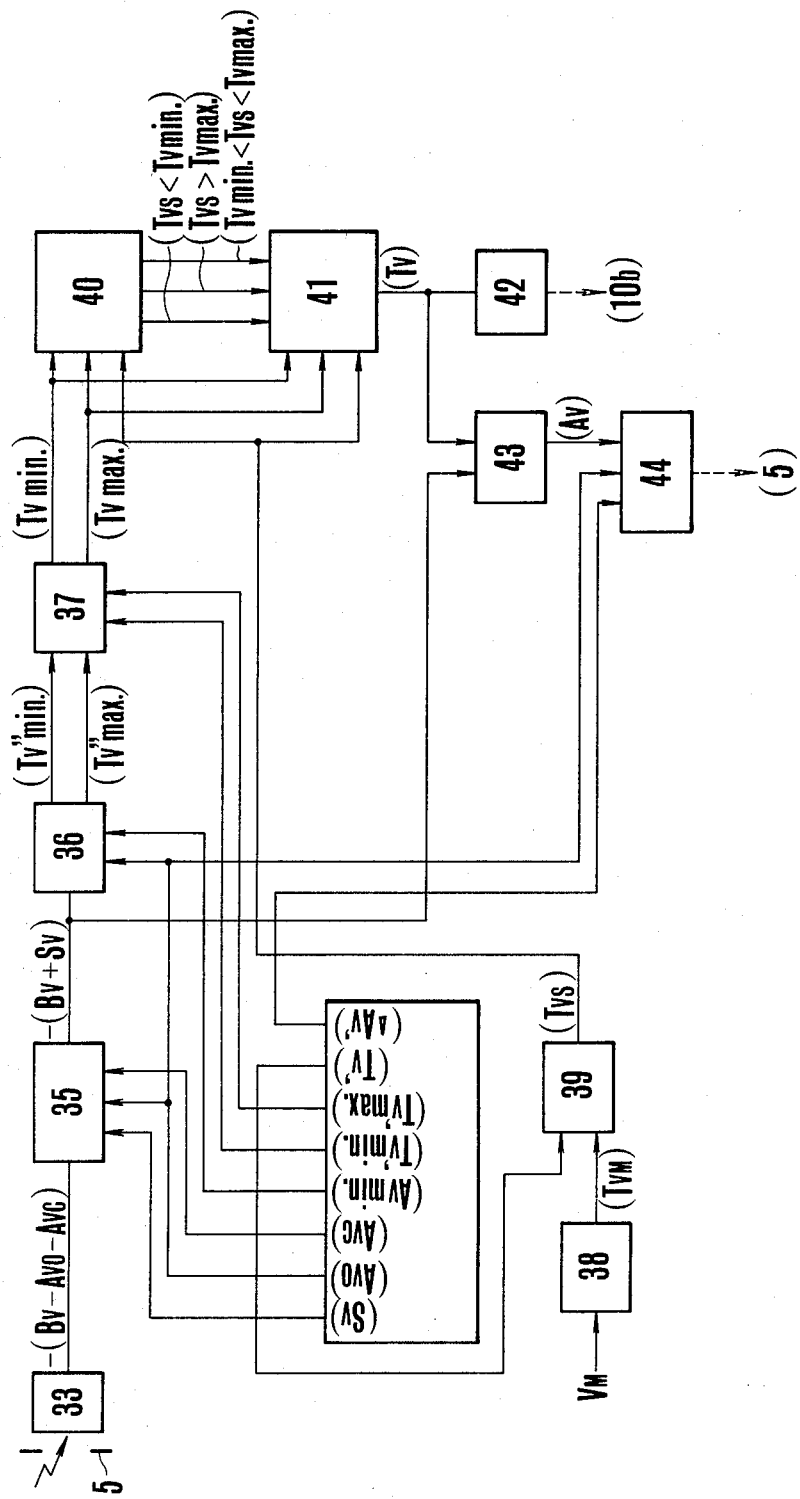
FIG. 11 shows a block diagram for showing the principal composition of an embodiment of the exposure control system for controlling the automatic exposure of a camera by means of the output of the motion detecting device of the present invention.

An exposure control system for controlling the automatic exposure of a camera in the aforementioned manner will is shown in FIG. 11.

In FIG. 11, a light measuring circuit 33 of the conventional TTL (through the lens) system for a single lens reflex camera forms an output which can be represented by Bv−Avo−Avc, where Bv is the object brightness, Avo is the totally opened aperture value and Avc is the aperture compensation information of the phototaking lens. A first calculating circuit 35 carries out the calculation—(Bv—Avo—Avc)−(Sv+Avo+Avc)=−(Bv+Sv) on the basis of the output of the light measuring circuit, the film sensitivity information Sv delivered from the photographic information setting circuit 34, the totally opened aperture value Avo and the aperture compensating information Avc. A second calculating circuit 36 serves for determining the minimum and the maximum exposure time Tv" min and Tv" max for producing proper exposure as explained in accordance with FIG. 10. This is done on the basis of the output−(Bv+Sv) of the first calculation circuit 35, the totally opened aperture ratio Avo delivered from the photographic information setting circuit 34 and the minimum exposure aperture value Av min. A third calculation circuit 37 determines the minimum and the maximum exposure time Tv min and Tv max within the shutter-aperture range explained with respect to FIG. 10. This is done on the basis of the outputs Tv" min and Tv" max of the second calculation circuit 36, and the minimum and the maximum exposure time Tv' min and Tv' max delivered from the photographic information setting circuit 34 so as to be controlled by the shutter. A converting circuit 38 produces the exposure time $Tv_M$ of FIG. 10 in response to the output $V_M$ of the motion detecting device. A select circuit 39 selects the shorter of the exposure times $Tv_M$ and Tv', compares the output $Tv_M$ of the converting circuit 38 with the exposure time Tv' preselected by the photographer and delivered from the above mentioned photographing information setting circuit 34. A determination circuit 40 determines which of the outputs Tvs(=$Tv_M$ or Tv') of the select circuit, Tv min, and Tv max is the larger so as to deliver the signals for the states Tvs>Tv max, Tv min<Tvs<Tv max and Tvs<Tv min. A select circuit 41 selects one of Tvs, Tv min or Tv max on the basis of the output of the determination circuit 40, so that the output of the select circuit 41 is the most suitable exposure time Tv to be used for taking a picture, whereby the shutter 10a, 10b (in FIG. 4) is now controlled with the output Tv of the select circuit 41 by means of a shutter circuit 42. An aperture value determination circuit 43 determines the most suitable exposure aperture value Av by making a calculation Bv+Sv−Tv=Av based upon the output Tv of the select circuit 41 and the output—(Bv+Bs) of the first calculation circuit 35. A diaphragm control circuit 44 controls closing of the aperture 5 from its totally opened state to its value for taking a picture. This is done on the basis of the output Av of the aperture value determination circuit 43, the totally opened aperture value Avo and the closed value ΔAv′ of the aperture 5 received from the photographic information setting circuit 34.

The automatic exposure control system shown in FIG. 11 is constructed to carry out the automatic exposure control of a camera as explained in accordance with FIG. 10.

Figure 12:
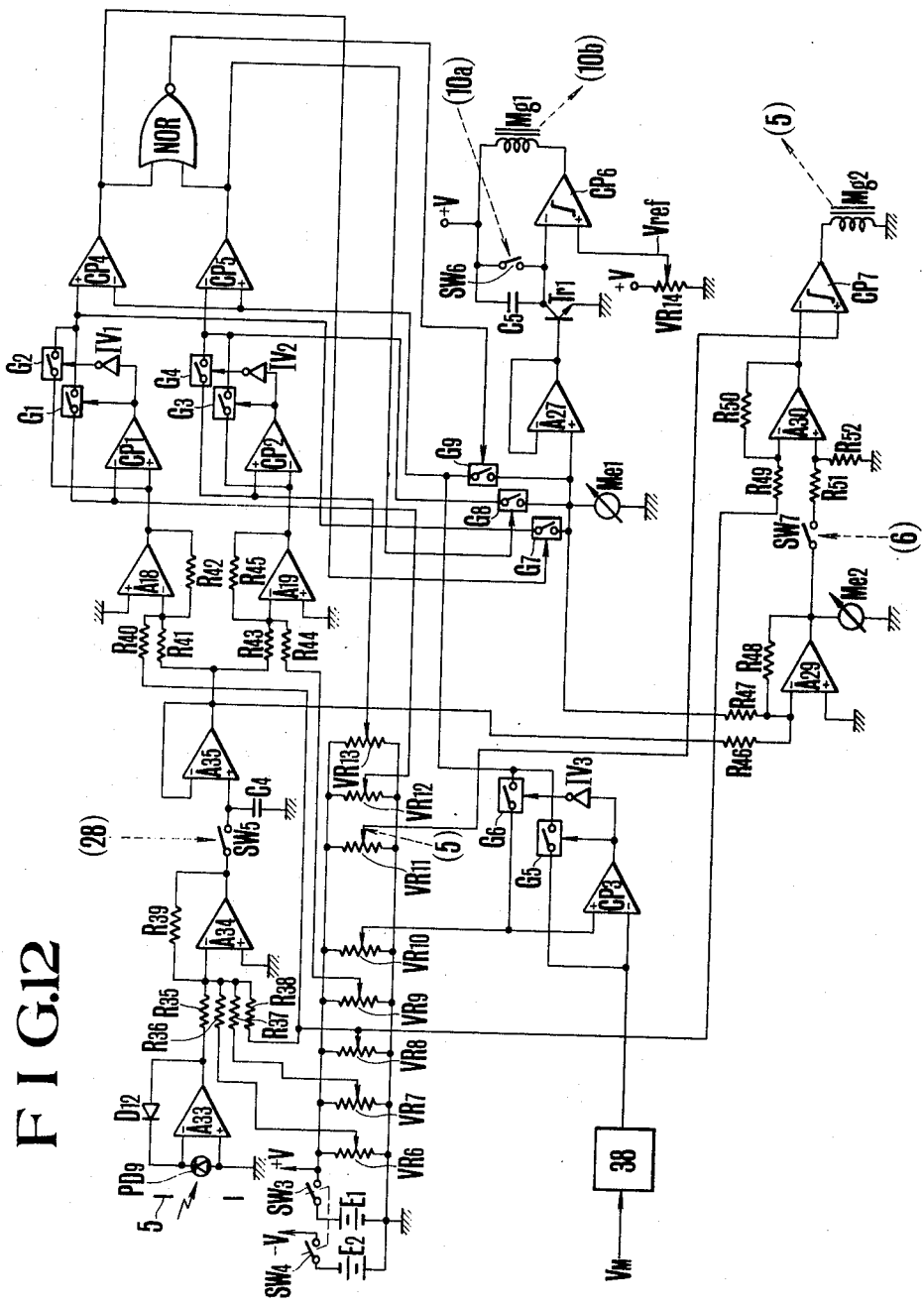
FIG. 12 shows a circuit diagram for showing the detailed composition of the circuit shown in FIG. 11.

Details of the circuit shown in FIG. 11 appear in FIG. 12. Here gauged power switches SW3 and Sw4 apply power sources E1 and E2 to the system. An operational amplifier A33, a diode D12 and a photodiode PD9 form a circuit for detecting the object brightness. The latter circuit corresponds to the light measuring circuit 33 in FIG. 11. The photodiode PD9 receives the object light coming from the lens 4 (shown in FIG. 4) through the aperture 5 so that the output of the operational amplifier A33 produces the value (Bv−Avo−Avc) as mentioned.

A variable resistance VR6 serves for setting the film sensitivity Sv and a variable resistance VR7 for setting the aperture compensation information Avc of the taking lens. A variable resistance VR8 sets the totally opened aperture value Avo of the taking lens, a variable resistance VR9 sets the minimum exposure aperture value Av min, a variable resistance VR10 sets the exposure time Tv′ preselected by the photographer, and a variable resistance VR11 operatively engages the the aperture so as to close the aperture 5 to an amount ΔAv′. Two variable resistances VR12 and VR13 serve for setting the minimum and the maximum exposure time Tv′ min and Tv′ max definable by the shutter and form the photographic information setting circuit 34 shown in FIG. 11. The circuitry composed of the operational amplifier A34 and the resistances R35, R36, R37, R38 and R39 carries out the calculation—(Bv—Avo—Avc)−(Sv+Avo+Avc)=−(Bv+Sv) on the basis of the output (Bv—Avo—Avc) of the amplifier A33 and the outputs Sv, Avc and Avo of the variable resistances VR6, VR7 and VR8. This corresponding to the first operational circuit 35 in FIG. 11.

A memory capacitor C4 stores the output −(Bv+Sv) delivered through the switch SW5 from the operational amplifier A34. A buffer amplifier A35 is a buffer for the value memorized in the condenser C4 and is included in the first operational circuit 35 in FIG. 11. The switch SW5 is closed when the camera release button 28 reaches a first step and opened with the second step.

Operational amplifiers A18 and A19 and resistances R40, R41, R42, R43, R44 and R45 form the circuit for determining the minimum and the maximum exposure time Tv″min and Tv″max capable of giving a proper exposure based upon the output—(Bv+Sv) of the above mentioned buffer amplifier A35 and the outputs Avo and Av min of the variable resistances VR8 and VR9. This circuit corresponds to the second operational circuit 36 in FIG. 11. In this circuitry the output of the operational amplifier A18 represents Tv″min while the output of the operational amplifier A19 represents Tv″max.

The circuitry composed of comparators CP1 and CP2, inverters IV1 and IV2 and the analog gates G1, G2, G3 and G4 determines the minimum and the maximum exposure time Tv min and Tv max within the shutter aperture operative range on the basis of the outputs Tv″min and Tv″max of the above mentioned operational amplifiers A18 and A19 and the outputs Tv′min and Tv′max of the variable resistances VR12 and VR13. This circuitry corresponds to the third operational circuit 37 in FIG. 11. Namely, in this circuitry, the comparator CP1 determines which of Tv″min or Tv′min is larger than the other so that if Tv″min>Tv′min, Tv″min is delivered through the analog gate G1 as Tv min, while if Tv″min<Tv′min, Tv′min is delivered through the analog gate G2 as Tv min. In the same way, the comparator CP2 determines which of Tv″max or Tv′max is larger than the other so that if Tv″max<Tv′max, Tv″max is delivered through the analog gate G3 as Tv max, while if Tv″max>Tv′max is delivered through the analog gate G4 as Tv max.

The circuitry composed of comparator CP3, inverter IV3 and analog gates G5 and G6 serves for selecting either the output $Tv_M$ from the converting circuit 38 or the output Tv′ of the variable resistance VR10 (which is smaller than the other, namely the shorter exposure time out of the two outputs), corresponding to the select circuit 39 in FIG. 11. In this circuitry the comparator CP3 determines which of $Tv_M$ or Tv′ is larger so that if $Tv_M$>Tv′, Tv′ is delivered through the analog gate G6 as Tvs, while if $Tv_M$<Tv′, $Tv_M$ is delivered through the analog gate G5 as Tvs.

A converting circuit 38 for converting the output VM of the motion detecting device into a signal representing the corresponding exposure time $Tv_M$ is composed of any voltage dividing circuit and/or amplifying circuit etc. and the detailed drawing for the circuit is omitted here.

The circuitry composed of comparators CP4, CP5 and nor gate NOR frames the output Tv min of the above mentioned analog gates G1 and G2 and the output Tv max of the analog gates G3 and G4 with the output Tvs(=$Tv_M$or Tv′) in order to produce a determination signal indicating the state Tvs<Tv min, Tvs>Tv max or Tv min<Tvs<Tv max respectively, and corresponds to the determination circuit 40 shown in FIG. 11. In this circuitry, the comparator CP4 determines which of Tv min or Tvs is larger than the other while the comparator CP4 determines which of Tv max or Tvs is larger than the other so that if Tvs<Tv min the comparator CP4 delivers the high signal while if Tvs>Tv max the comparator CP5 produces the high level signal and if Tv min<Tvs<Tv max the nor gate NOR produces the high level signal. The high level signal of the comparators CP4, CP5 or the nor gate NOR respectively represent the state Tvs<Tv min, Tvs>Tv max or Tv min<Tvs<Tv max.

The circuitry composed of analog gates G7, G8 and G9 elects output Tv min of the analog gates G1, G2, the output Tv max of the analog gates G3, G4 or the output Tvs of the analog gates G5, G6, as the most suitable exposure time Tv to be adopted for taking a picture and corresponds to the select circuit 41 shown in FIG. 11. In this circuitry, if the output of the comparator CP4 is a "high level", namely Tvs<Tv min, Tv min is selected as Tv because the analog gate G7 is closed, while if the output of the comparator CP5 is "high", namely Tvs>Tv max, Tv max is selected as Tv because the analog gate G8 is closed if the output of the nor gate NOR is "high", namely Tv min<Tvs<Tv max, Tvs (=$Tv_M$ or Tv') is selected as Tv because the analog gate G9 is closed.

The circuitry consisting of a buffer amplifier A27, a transistor Tr1, the capacitor C5, a switch SW6, a variable resistance VR14, a comparator CP6 and an electromagnet Mg1 is the one for controlling the shutter in accordance with the output Tv of the above mentioned analog gates G7–G9, corresponds to the shutter control circuit 42 shown in FIG. 11.

Hereby, the shutter is controlled by means of this circuitry as follows. Namely, the output Tv of the analog gates G7–G9 is delivered to the base of the transistor Tr1 through the buffer amplifier A27, so as to be converted into a logarithmically prolonged collector current. On the other hand, the switch SW6 is operatively engaged with the first shutter curtain 10a (FIG. 4) so as to be opened at the same time with the start of the first shutter curtain 10a in such a manner that when the first shutter curtain 10a is released so as to start to run with the second stroke of the release button 28 the switch SW6 is opened, whereby the condenser C5 starts to be charged, while the potential at the collector of the transistor Tr1 lowers gradually. When the potential at the collector has lowered so far as to reach the referenced voltage Vref1 set at the variable resistance VR10 the output of the comparator CP6 is converted from the "low level" into the "high level". Hereby the current supply to the electromagnet Mg1 for holding the second shutter curtain is interrupted so that the second shutter curtain 10b (FIG. 4) is released so as to start to run in order to terminate the exposure to the film F (FIG. 4).

Me1 is the meter for displaying the exposure time Tv in accordance with the output Tv of the analog gates G7–G9.

The circuitry consisting of the operational amplifier A29 and the resistances R46, R47 and R48 is the one for making calculation Bv+Sv−Tv=Av with the output—(Bv+Sv) of the above mentioned amplifier A35 and the output Tv of the analog gates G7–G9 in order to determine the most suitable exposure aperture value Av, corresponding to the aperture value deciding circuit 43 shown in FIG. 11.

Hereby, Me2 is the meter for displaying the exposure aperture value Av in accordance with the output Av of the above mentioned operational amplifier A29.

The circuitry consisting of the switch SW7, the operational amplifier A30, the resistances R49, R50, R51, R52, the comparator CP7 and the electromagnet Mg2 is the one for controlling the aperture 5 in accordance with the output Av of the above mentioned operational amplifier A29, the output Avo of the variable resistance VR8 and the output ΔAv' of the variable resistance VR11, corresponding to the diaphragm control circuit 44 shown in FIG. 11.

The aperture 5 is controlled by means of this circuitry as follows. The switch SW7 is so designed as to be closed when the viewing mirror 6 (FIG. 4) is withdrawn out of the photographing optical path after the second stroke of the release button 28, whereby when the switch SW7 is closed the operational amplifier A30 decides the closing down amount ΔAv necessary for closing the aperture 5 out of the totally opened state (Avo) into the aperture value Av by making a calculation—(Avo−Av)=ΔAv in accordance with the output Av of the operational amplifier A29 and the output Avo of the variable resistance VR8. On the other hand, the aperture 5 is so designed as to start to be closed out of the totally closed state by means of a conventional automatic diaphragm mechanism after the viewing mirror 6 has been retired out of the photographing optical path, whereby the aperture 5 has started to be closed out of the totally opened state, the variable resistance VR11 delivers the closing down amount ΔAv' of the aperture 5 out of the totally opened state, so that the comparator CP7 compares the output ΔAv of the above mentioned operational amplifier A30 with the then output ΔAv' of the variable resistance VR11 in such a manner that the output of the comparator CP7 changes out of the "low level" into the "high level" when ΔAv' and ΔAv become equal to each other. Thus, a current starts to be supplied to the electromagnet Mg2 so as to stop the further closing of the aperture 5. Namely, the aperture 5 has been closed down to the aperture value Av. Hereby, the above mentioned first shutter 10a is released only after the aperture 5 has been closed down to the aperture value Av.

Hereby, it should be added that for example such a composition as is disclosed in the U.S. Pat. No. 3,988,748 (patented on Oct. 26, 1976, granted to Iura et al for the invention entitled "single lens reflex camera") in the posession of the asignee of the present invention can be adopted as a concrete embodiment of the single lens reflex camera for realizing the control of the shutter 10a, 10b and the aperture 5 as explained above.

Below the second embodiment of motion detecting device in accordance with the present invention will be explained in detail. The second embodiment is intended to detect, the relative motion rate or velocity between the object and the device by means of a self-scan area type image sensor as photoelectric device.

Figure 13:
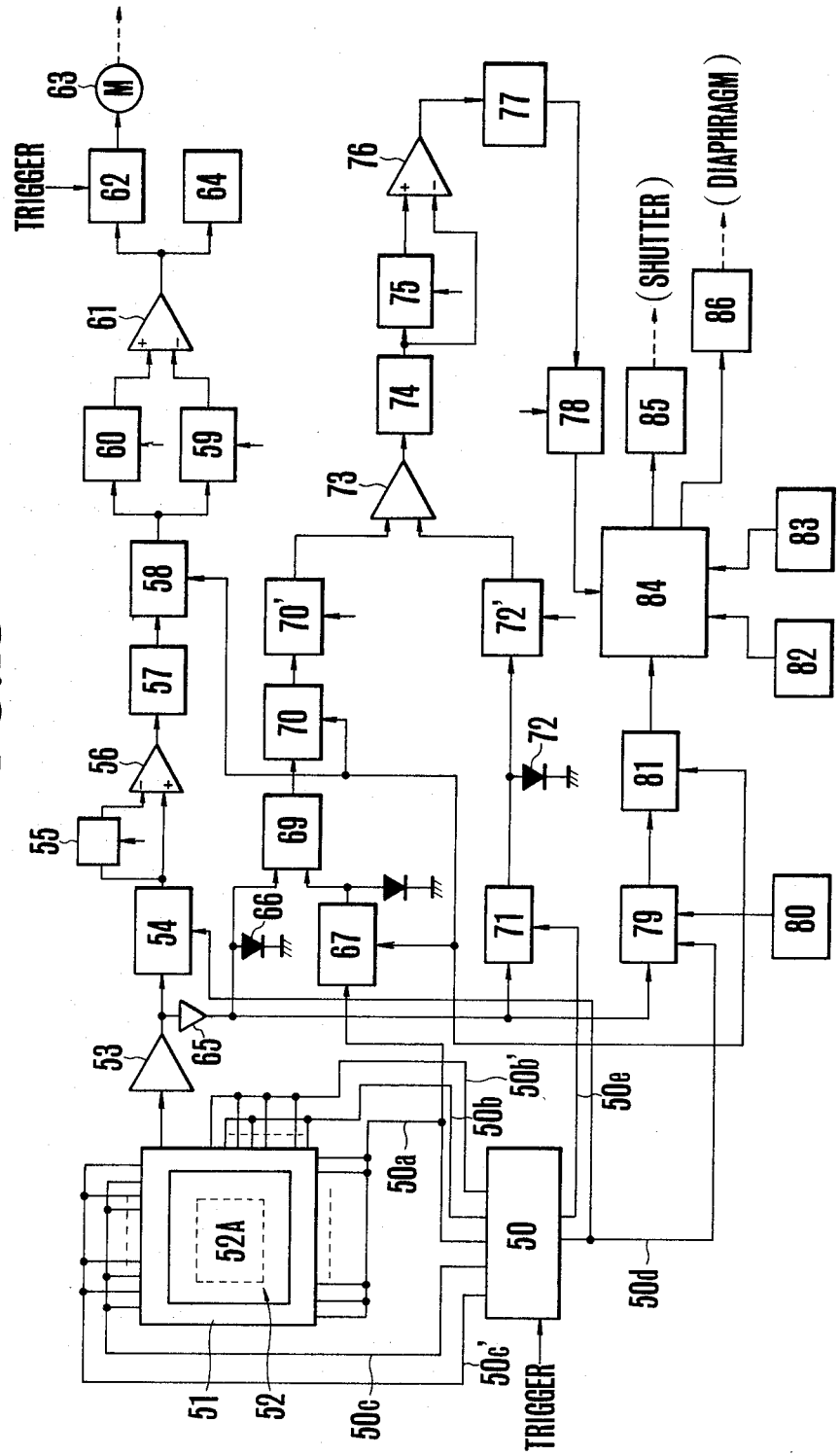
FIG. 13 shows a block diagram for showing the composition of the camera control system in which the second embodiment of the present invention is adopted.

FIG. 13 shows a camera control system as a whole, in which the second embodiment is adopted.

In the drawing, 50 is a controller producing various timing pulses for controlling the present system in order to control the system as a whole. 51 is an image sensor having a light sensing part (area type sensor away) consisting of fine segments in m-lines x n-rows, being arranged at the image forming plane of the photographing lens not shown in the drawing, namely at a position equivalent to the film plane. Hereby, the above each segment is for example shaped as square with 15μ side. It is desirable that the segment should have an area mearly equal to that of the permissible circle of confusion of the camera. The number of the segments can be chosen optionally in accordance with necessity, for example 100×100 or several ten×several ten. The controller 50 delivers the start pulse to the photogate of the image sensor 51 through the signal line 50a in order that the charge stored in the light sensing part 52 should be taken into the vertical shift resistor parts not shown in the drawing. Further, immediately after that the vertical clock pulse is delivered through the signal lines 50b and 50b' in order that the charge taken into the above mentioned vertical shift resistor parts should be transferred to the horizontal shift resistor part not shown in the drawing, one by one, while the horizontal clock pulse is delivered through the signal lines 50c and 50c' in order that the charge taken into the above mentioned horizontal shift resistor parts should be transferred to the output part not shown in the drawing one by one. Namely, hereby as image sensor an area type CCD photosensor of interline transfer system is adopted.

Figure 14:
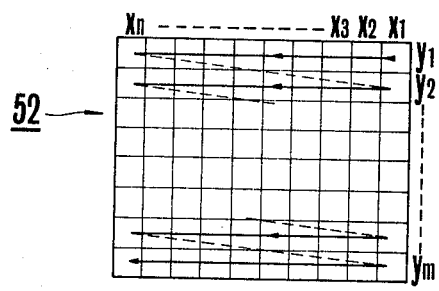
FIG. 14 shows a diagram for explaining the read out consequence of the output of the area type photo-sensor array adopted in the control system shown in FIG. 13.

By means of the above mentioned three kinds of clock pulses, the charge stored in the light sensing portion 52 of the image sensor 51, namely the light amount informations of the picture elements forming the object image formed by means of the photographing lens are taken out through the output part not shown in the drawing, in sequence shown with the arrow in FIG. 14. Supposing that the addresses of the segment constituting the light sensing part 52 of the image sensor in FIG. 14 be represented with (xi, yj) (i=1, 2 ... n, j=1, 2 ... m), the signals are delivered in sequence of (x1, y1), (x2, y1), ... (xn, y1), (x1, y2), (x2, y2) ..., (xn−1, ym), (xn, ym). Consequently, in case of the present embodiment with the image sensor 51 having a light sensing part 52 consisting of m×n segments, m×n time serial image scanning signal can be obtained during one scanning by the sensor. From the controller 50, a clock pulse re-synchronized with the horizontal clock pulse is delivered to the focus detection view field setting circuit and the light measuring view field setting circuit to be explained below through the signal line 50d and a reset pulse (produced at the termination of each scanning) is delivered so as to clear the signals stored in each integrating circuit to be explained later during each scanning through the signal line 50e. The thus obtained light amount information (hereinafter abreviated as video signal) of each picture element forming the image object is amplified by means of a video amplifier 53 up to a certain level at which the later signal process is easy and input to the focus view field setting circuit 54. The focus detection view field setting circuit 54 consists of a counter receiving the synchronized clock pulses delivered through the signal line 50d and an analog gate which is opened so as to allow the above mentioned video signal to pass when the counter has counted first predetermined count number and closed so as to interrupt the passage of the video signal when the above mentioned counter has counted the second predetermined count number. In this way, the focus view field setting circuit 54 delivers only the video signal produced in the area 52A shown in a broken line in the light sensing part 52 of the image sensor 51 so that this area 52A becomes the focus detection area. The video signal produced in the area 52A is delivered to the differential amplifier 56 on the one hand through the signal delay circuit 55 and on the other hand directly. The signal delay circuit 55 makes the video signal delayed by a certain predetermined amount (namely for one clock pulse) in response to the horizontal clock pulse from for example the controller 50. Consequently, the differential amplifier 56 to which the video signals with a certain phase difference are delivered produces the difference between the signals of the video signal with a certain time interval, namely a signal representing the difference between the light amounts of the two picture elements close to each other on the light sensing part 52 on the image sensor 51. 57 is the absolute value circuit for producing the absolute value of the signal representing the difference between the light amounts of these picture element, while 58 is the integrating circuit for integrating the output of the absolute value circuit 57. Consequently, the output of the integrating circuit 58 corresponds to the total sum of the absolute values of the difference between the light amounts of the picture elements in the area 52A in the light sensing part 52 of the image sensor 51, so that when the sharpness of the object image goes up the difference between the light amounts of the picture elements becomes larger in such a manner that the output of the integrating circuit 58 goes up, while when the sharpness of the object image goes down the difference between the light amounts of the picture elements becomes smaller in such a manner that the output of the integrating circuit 58 goes down. Namely, the output of the integrating circuit 58 represents the sharpness of the object image. Hereby, the integrating circuit 58 is so designed that the content is cleared by means of the reset pulse from the controller 50 so that the sharpness information of the object image for each scanning by the image sensor is delivered. 59 is the sample hold circuit for sample-holding the output of the above integrating circuit 58 before being cleared in response to a pulse synchronized with the start pulse delivered from the above controller 50 to the image sensor 51, 60 is the peak hold circuit for holding the peak value of the above integrating circuit 58 in response to the above mentioned synchronized pulse and 61 is the comparator for comparing the output of the sample hold circuit 59 with the peak hold circuit 60, whereby the comparator 61 is so designed as to produce a "low level" signal when the output of the sample hold circuit 59 is equal to or larger than the peak hold circuit 60 and a "high level" signal when the output signal of the sample hold circuit 59 is smaller than the output of the peak hold circuit 60. 62 is the motor control circuit for controlling the motor 63 for driving the photographing lens in accordance with the trigger signal produced with the first stroke of the camera release button not shown in the drawing and the output signal of the above comparator 61, and 64 is the in-focus display circuit for the in-focus display in accordance with the output of the above comparator 61.

Namely, the automatic focusing system consists of the above mentioned circuit group. Below the automatic focusing operation of the photographing lens not shown in the drawing by means of the automatic focusing system will be explained.

Figure 15:
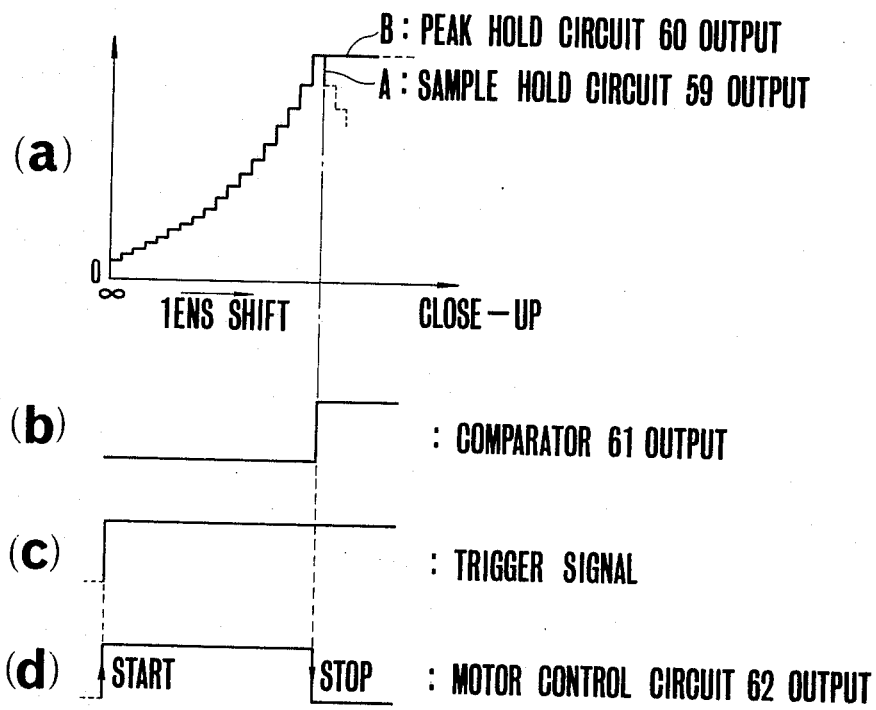
FIG. 15 shows the wave forms of the output of the circuit block of the important part in the automatic focus control system in the control system shown in FIG. 13.

With the first stroke of the camera release button not shown in the drawing, a trigger signal is produced as is shown in FIG. 15(c) so as to trigger the controller 50 and the motor control circuit 62 in such a manner that the controller 50 delivers to the image sensor 51 the above mentioned three kinds of clock pulses, namely the start pulse, the vertical and the horizontal clock pulse so as to start the reading out of the output of the image sensor 51, while the motor control circuit 62 starts the motor 63 as is shown in FIG. 15(d). Now let us suppose that the object not shown in the drawing be at a certain finite distance from the camera and by means of the motor 63 the photographing lens not shown in the drawing be being advanced forwards from a certain stop position, for example, a position further withdrawn from the infinite in-focus position toward the in-focus position. At this time along with the advance of the photographing lens the sharpness of the object image formed on the image sensor 51 is increased gradually so that the output of the above integrating circuit 58 is increased gradually. The output of the integrating circuit 58 is sample-held by means of the sample hold circuit 59 for every scanning by means of a pulse synchronized with the start pulse from the controller 50, while the peak values are held one by one by the peak hold circuit 60. Hereby, until the photographing lens reaches the in-focus position for the object, the output A of the sample hold circuit 59 and that B of the peak hold circuit 60 are goes up in the same way on the same level as is shown in FIG. 15(a) and therefore, during this period the output of the comparator 61 is the "low" level signal as is shown in FIG. 15(b). When the photographing lens has reached the in-focus position for the object (hereby, the output of the integrating circuit 58 is largest because the sharpness of the object image is highest) and passed the position a little, the sharpness of the object image lowers a little from the highest level so that the output of the integrating circuit 58 also lowers a little from the highest level (held by the peak hold circuit). Consequently, at this time the output A of the sample hold circuit 59 becomes smaller than the output B of the peak hold circuit 60 as is shown in FIG. 15(a) so that the output of the comparator 61 changes out of the "low" level, into the "high" level as is shown in FIG. 15(b). Thus, the motor control circuit 62 immediately stops the motor 63 as is shown in FIG. 15(d), so that the photographing lens stops at the in-focus position for the object (strictly speaking a position a little further advanced). Thus, the automatic focusing of the photographing lens is completed. When the output of the above comparator 61 changes out of the "low" level into the "high" level, the display circuit 64 is driven so as to display that the photographing lens has reached the in-focus position. In this way, the automatic focusing of the photographing lens is completed.

On the other hand, the output of the video amplifier is logarithmically compressed by the logarithmically compressing diode 66 through the buffer amplifier 65 and then delivered to the one input terminal of the adding circuit 69. 67 is the Miller integrating circuit which starts to operate in accordance with a pulse synchronized with the start pulse from the controller so as to produce an output increasing in proportion to the lapse of time and is cleared with the reset pulse from the controller 50. The output of the Miller integrating circuit 67 is logarithmically compressed by the logarithmically compressing diode 68 and then delivered to the other input terminal of the above adding circuit 69. Thus, the output of the adding circuit 69 is the product of the output of the Miller integrating circuit 67 with the output of the video signal from the video amplifier 53. The output of the above Miller integrating circuit which goes up proportionally to the lapse of time is the one corresponding to the above horizontal synchronized clock pulse, in other words, the address of each picture element of the image formed on the image sensor 51 so that the output of the above adding circuit 69 corresponds to the product of the address of each picture element with the light amount of the picture element with the address. The output of the adding circuit 69 is integrated with the integrating circuit 70. The integrating circuit 70 is cleared with the reset pulse from the controller 50 so that the output of the integrating circuit 70 is the sum of the product of the light amount of each picture element obtained for every scanning of the object image by means of the image sensor 51 with the address of the picture element. Now let us suppose that the address N (xi, yj) be defined with the sequence of the scanning for each picture element of the image formed on the image sensor 51 and the light amount of the picture element be L (xi, yj). Then the output of the above integrating circuit 70 corresponds to $$\sum_{i,j=1}^{m\cdot n} L(xi, yj) \cdot N(xi, yj)$$

71 is the integrating circuit for integrating the signal for each scanning of the video signal produced from the video amplifier 53 and therefore, the output corresponds to the sum of the light amount of all of the picture elements, namely $$\sum_{i,j=1}^{m\cdot n} L(xi, yj).$$

The output of the integrating circuit 71 is logarithmically compressed with the logarithmically compressing diode 72. 70' and 72' are the sample hold circuits for sample-holding the outputs of the above integrating circuits 70 and 71 before being cleared in response to a pulse synchronized with the above start pulse from the above controller 50. The outputs of these sample hold circuits 70' and 72' are delivered to the differential circuit 73. As is clear from the meaning of the above signals, the output of the differential amplifier 73 is the signal corresponding to $$\sum_{i,j=1}^{m\cdot n} L(xi, yj) N(xi, yj) / \sum_{i,j=1}^{m\cdot n} L(xi, yj)$$

The output of the differential amplifier 73 is logarithmically prolonged with the logarithmically prolonging circuit 74. The above relation defines the center of gravity of the distribution of the light amount of all of the produce elements forming the object image so that after all the output of the logarithmically prolonging circuit 74 is the signal for defining the position of the center of gravity of the distribution of the light amount of the object image.

75 is the signal delay circuit for delaying the output of the above logarithmically prolonging circuit 74 by one scanning periode in response to the pulse synchronized with the start pulse delivered from the above controller 50 to the image sensor 51. 76 is the differential amplifier for producing the difference between the output of the logarithmically prolonging circuit 74 and that of the signal delay circuit 75, namely the signal corresponding to the difference between the information of the position of the center of gravity of the light amount distribution of the image, obtained with a certain scanning and that obtained with the scanning immediately before the above scanning. As has already been explained, the position of the center of the light amount distribution of the object image varies in accordance with the relative motion of the object to the camera, if any, so that it is clear that the "non-zero" output of the above differential amplifier 76 means that there takes place some relative motion and further the then level of the absolute value of the differential amplifier 76 corresponds to the velocity of the relative motion. The output of the differential amplifier 76 is converted into an absolute value with the absolute value circuit 77 and delivered to the peak hold circuit 78 operable in response to a pulse synchronized with the start pulse produced from the above controller 50 so as to detect the peak value in the same way as in case of the above peak hold circuit 60. Consequently, hereby with the output of the peak hold circuit 78 the relative motion rate or velocity between the object and the camera is represented.

Hereby, the motion detecting system is composed with the circuit group.

79 is the light measurement view field setting circuit for picking up only the part necessary for the light measurement out of the video signals produced with the above video amplifier 53, so designed as to operate in response with a horizontal synchronized clock pulse from the controller 50 in the same way as the afore mentioned focus detecting view field setting circuit. 80 is the light measurement mode change over circuit for changing over the above mentioned light measurement view field for the mean light measurement or for the center priority light measurement, so designed as to alter the view field setting state of the view field setting circuit 79 in order to change the light measurement mode. 81 is the integrating circuit for integrating the light measuring signal obtained through the above light measurement view field setting circuit 79, so designed as to be cleared by means of the reset pulse from the controller 50 in order to produce the information of the brightness of a certain determined portion of the object image obtained with the image sensor 51 for every scanning in the same way as other integrating circuit 58, 67, 70 and 71. The output of the integrating circuit 81 is delivered to the exposure operational circuit 84. 82 is the film sensitivity setting circuit for setting the sensitivity of the film to be used and 83 is the exposure time setting circuit for setting the exposure time, whereby the output of these setting circuits 82 and 83 are delivered to the exposure operational circuit 84. 85 is the shutter control circuit for controlling the shutter not shown in the drawing in accordance with the exposure time produced from the exposure operational circuit 84 and 86 is the diaphragm control circuit for controlling the diaphragm not shown in the drawing in accordance with the exposure aperture produced from the exposure operational circuit 84.

Figure 16:
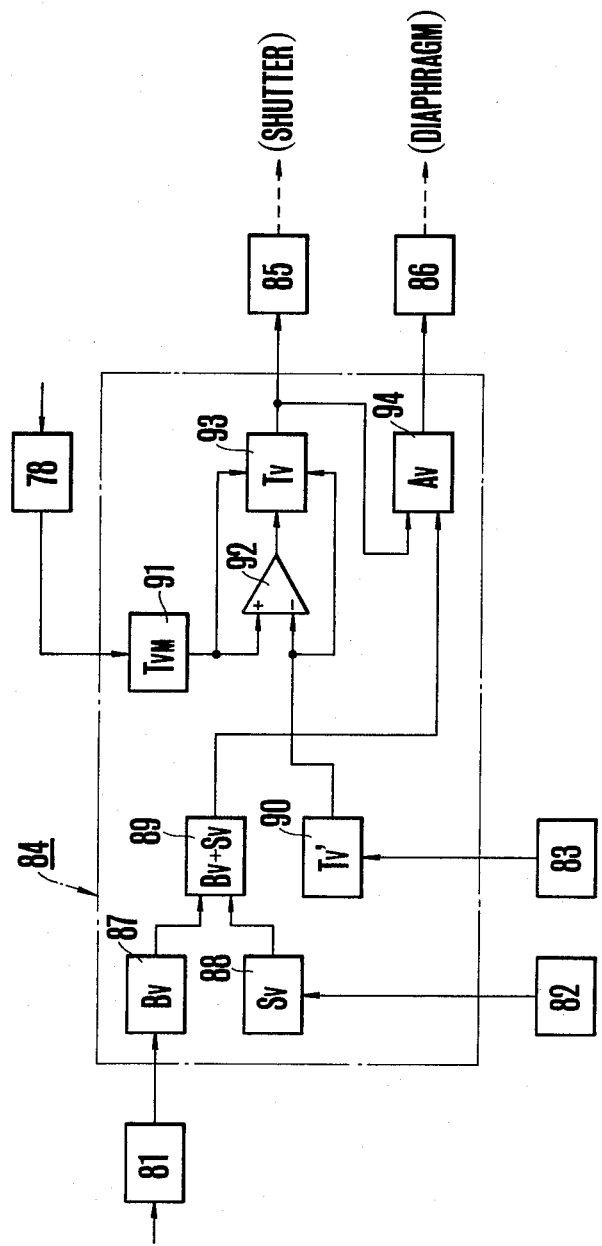
FIG. 16 shows a block diagram of an embodiment of the automatic exposure control system in the control system shown in FIG. 13.

Hereby, the automatic exposure control system is composed with the above mentioned circuit group, whereby the above mentioned exposure operational circuit 84 is composed as is shown in FIG. 16.

Namely, in FIG. 16, 87 is the converting circuit for converting the object brightness information supplied from the above integrating circuit 81 into a voltage corresponding to the brightness value Bv, 88 is the converting circuit for converting the output of the film sensitivity setting circuit 82 into a voltage corresponding to the film sensitivity value Sv and 89 is the adding circuit for adding the outputs Bv and Sv of the above both converting circuits 87 and 88, so as to produce Bv+Sv. 90 is the converting circuit for converting the output of the exposure time setting circuit 83 into a voltage corresponding to the exposure time Tv' and 91 is the converting circuit for converting the output of the above peak hold circuit 78 into a voltage corresponding to the exposure tim $Tv_M$ explained in accordance with the first embodiment. Hereby, the converting circuits 81, 88, 90 and 91 may be appropriate voltage converting circuits such as voltage dividing circuit, amplifying circuit and so on.

92 is the comparator for determining which of the output Tv' of the above comparator 90 or the output $Tv_M$ of the above comparator 91 is larger than the other and 93 is the select circuit for selecting either of the Tv' or $Tv_M$ which is smaller than the other in accordance with the output of the comparator 92, whereby the output of the select circuit 93 is delivered to the shutter control circuit 85 as suitable exposure time Tv. Consequently, the shutter not shown in the drawing is controlled with the exposure time Tv.

94 is the aperture value determining circuit for determining the most suitable exposure value Av by making the calculation Bv+Sv−Tv=Av in accordance with the output Bv+Sv of the above adding circuit 89 and the output Tv of the select circuit 93, whereby the output Av of the aperture value determining circuit 94 is delivered to the diaphragm control circuit 86. Namely, the diaphragm not shown in the drawing is controlled in accordance with the aperture value Av.

Hereby the automatic exposure control of the camera is carried out by means of the above mentioned composition.

With the camera control system as explained above, the automatic exposure control of the camera is as well as the automatic focusing of the photographing lens completed, whereby the relative motion rate or velocity between the object and the camera is considered. Consequently, when the system is adopted in the conventional camera, only by bringing the object to be photographed in focus it has become possible to always take a picture in the most suitable state, namely the so called automatic camera can be realized. However, in order to realize such a camera, it is essential to realize the system with the integrated circuit so that the system can be put in the small case.

Figure 17:
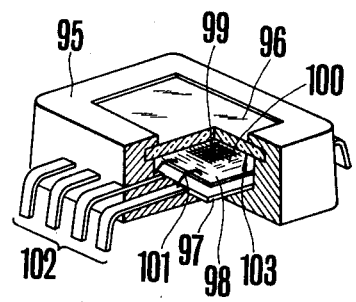
FIG. 17 shows an embodiment of IC package in partial sectional view where all of the circuit in the control system shown in FIG. 13 is integrated.

FIG. 17 shows an embodiment, whereby the system is realized with the integrated circuit and put in the small case. In the drawing, 95 is the non-transparent casing in which the integrated circuit is to be put in, 96 is the transparent portion consisting of transparent plastic or optical glass for taking in the light beam. 97 is the ceramic base plate, on which a silicone chip 98 is fixed. The silicone chip 98 is the integrated circuit, whereby the image sensor 99 is formed at the center while the process circuit 100 is formed along the circumference. In the present embodiment, the image sensor 99 and the process circuit 100 are formed on the same silicone chip, whereby it is possible to form them on the different chips.

101 is the conductor consisting for example of a fine gold wire or aluminum wire for connecting the input and output terminal of the integrated circuit 98 with the external electrode 102 of the casing 95. This unit can be fixed correspondingly, by putting in the electrode 102 by means of a proper socket.

103 is the transparent thin film electrode (Nesa coat) metallized on the other surface of the transparent portion 96, serving as the insulator against the noise from outside.

Figure 18:
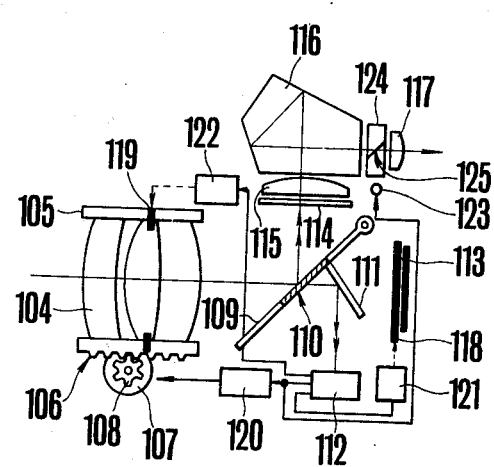
FIG. 18 shows in out-line, the composition of a single lens reflex camera in which the control system shown in FIG. 13 is built.

Below, the embodiment of the camera in which the control unit composed as explained above is built in will be explained in accordance with FIG. 18. The drawing shows a single lens reflex camera with the built in control unit.

In the drawing, 104 is the photographing optical system supported on the lens barrel 105. On a part of the lens barrel 105 the rack 106 is formed, whereby the rack 106 is engaged with the gear to be driven by means of the motor 106. Thus, in accordance with the forward or the backward rotation of the motor 107, the photographing optical system is advanced or withdrawn along the optical axis. 109 is the quick return mirror having a half-transparent portion 110 near the optical axis of the photographing optical system 104, whereby a sub-mirror 111 is provided behind the half-transparent portion 110 of the mirror 109 so as to deflect downwards a part of the light beam coming from the object through the photographing optical system 104. Below the sub-mirror 111, the control unit 112 realized with the integrated circuit as is shown in FIG. 17 is provided. It goes without saying that the light sensing surface of the image sensor (99 in FIG. 17) in the emit 112 must be arranged at a position optically equivalent to the surface of the film 113. The quick return mirror 109 and the sub-mirror 111 are so designed to be lifted up by means of a mechanism not shown in the drawing in synchronization with the shutter release in order to be retired completely out of the optical path. 114, 115 and 116 are respectively the focal plate, the condenser lens and the pentagonal prism used in the conventional single lens reflex camera, forming the view finder optical system together with the eye piece lens 117. 118 and 119 are respectively the shutter and the diaphragm. The efficiency of the control unit 112 is as explained before, so that when the switch not shown in the drawing is operated so as to actuate the control unit 112 and the members associated therewith in the state in which the object is in focus in the view finder, the sharpness of the object image is detected so as to start the motor 107 through the photographing optical system control circuit 120 in such a manner that the photographing optical system 104 is automatically set at the point at which the sharpness of the image object is highest on the film 113. At the same time in accordance with the relative motion between the object and the camera and the information as to the brightness of the object the above exposure time Tv and the above exposure aperture value Av are respectively given to the shutter control unit 121 and the aperture control unit 122. When the shutter button not shown in the drawing is operated, the shutter 118 and the diaphragm 119 operates so as to complete the exposure. It is naturally possible to constitute the shutter button as two stroke switch with the afore mentioned switch. 123 is the display element such as LED for making the in-focus display of the photographing optical system, whereby the light emitted from the display element 123 passes through the half-transparent portion 125 formed in the prism and the eye piece lens 117 in such a manner that the photographer acknowledge the in-focus state as visual information. Consequently, it is possible to manually set the photographing optical system 104, while observing the display state of the display element 123, whereby the control circuit 120, the motor 107 and the driving mechanism 106-108 are not necessary.

As explained above, it is possible for a camera with a built in control unit 112 of the present invention to take a clear picture of an object in quick motion in the most suitable in-focus state, which is quite profitable for the sports photography, the photographerless photography and so on.

What is claimed is:
1. A device for detecting the relative motion between an object and the device, comprising:
 (A) image forming means for forming an image of an object;
 (B) photoelectric means for producing electrical signals in response to radiation received, said photoelectric means being arranged to receive the object image formed by the image forming means; and
 (C) a signal processing circuit system for receiving the electrical signals produced from the photoelectric means and providing an electrical output indicative of at least whether or not relative motion has arisen between the object and the device, and for detecting whether the position of the center of gravity of the light quantity distribution of the object image formed on the photoelectric means is displaced or not in accordance with the electrical signals produced from the photoelectric means in order to detect whether or not the relative motion has arisen between the object and the device;
 (D) said signal processing circuit system including:
  (D-1) first detecting means for detecting the position of the center of gravity of the light quantity distribution of the object image formed on the photoelectric means in accordance with the electrical signals produced from the photoelectric means and for providing an output signal corresponding to the position of the center of gravity;
  (D-2) second detecting means for detecting the variation of the output signal provided by the first detecting means and for providing at least an output signal for indicating whether the position of the center of gravity is displaced or not;
 (E) said photoelectric means including at least one lateral effect photodiode having a characteristic such that two output signals thereof vary with the change in the position at which the radiation impinges; and the first detecting means being arranged for detecting the position of the center of gravity of the light quantity distribution of the object image in accordance with the two output signals of the lateral effect photodiode;
 (F) said first detecting means including:
  (F-1) first circuit means for obtaining the difference between the two output signals of the lateral effect photodiode, and for providing an output signal representing the difference;
  (F-2) second circuit means for obtaining the sum of the two output signals of the lateral effect photodiode, and for providing an output signal representing the sum; and
  (F-3) third circuit means for normalizing the output signal of the first circuit means with the output signal of the second circuit means so as to provide the output signal corresponding to the position of the center of gravity.

2. A device according to claim 1, wherein the second detecting means includes:
 fourth circuit means for detecting the variation ratio of the output signal of the third circuit means and for producing an output signal at least indicating whether or not the position of the center of gravity is displaced, with the level of the output signal corresponding to the displacement ratio of the position of the center of gravity.

3. A device according to claim 2, wherein the second detecting means further includes:
 fifth circuit means for detecting the level of the output signal of the fourth circuit means and for producing an output signal representing the relative motion ratio between the object and the device.

4. A device for detecting the relative motion between an object and the device, comprising:
 (A) image forming means for forming an image of an object;
 (B) photoelectric means for producing electrical signals in response to radiation received, said photoelectric means being arranged to receive the object image formed by the image forming means; and (C) a signal processing circuit system for receiving the electrical signals produced from the photoelectric means and providing an electrical output indicative of at least whether or not relative motion has arisen between the object and the device, and for detecting whether the position of the center of gravity of the light quantity distribution of the object image formed on the photoelectric means is displaced or not in accordance with the electrical signals produced from the photoelectric means in order to detect whether or not the relative motion has arisen between the object and the device;

(D) said signal processing circuit system including:
  (D-1) first detecting means for detecting the position of the center of gravity of the light quantity distribution of the object image formed on the photoelectric means in accordance with the electrical signals produced from the photoelectric means and for providing an output signal corresponding to the position of the center of gravity;
  (D-2) second detecting means for detecting the variation of the output signal provided by the first detecting means and for providing at least an output signal for indicating whether or not the position of the center of gravity is displaced or not;

(E) said photoelectric means including:
  (E-1) at least one group of photoelectric elements consisting of at least a first, a second, a third and a fourth photoelectric element, in which the first and the second elements are arranged close to each other so as to make a first pair, while the third and the fourth elements are also arranged close to each other so as to make a second pair, and wherein the first and the second pair are arranged at a predetermined distance from each other and every element produces the output signal corresponding to the radiation received;
  (E-2) said first detecting means detecting the position of the center of gravity of the light quantity distribution of the object image in accordance with the output signal of the four photoelectric elements;

(F) said first detecting means including:
  (F-1) first circuit means for obtaining the difference between the output signals of the first and the third photoelectric means and for providing an output signal representing the difference;
  (F-2) second circuit means for obtaining the sum of the output signals of the second and the fourth photoelectric elements and for providing an output signal representing the sum;
  (F-3) third circuit means for normalizing the otuptu signal of the second circuit means so as to provide the output signal corresponding to the position of the center of gravity.

5. A device according to claim 4, wherein the second detecting means includes:
fourth circuit means for detecting the variation rate of the output signal of the third circuit means and for producing an output signal at least indicating whether the position of the center of gravity is displaced or not and having a level corresponding to the displacement rate of the position of the center of gravity.

6. A device according to claim 5, wherein the second detecting circuit means further includes:
fifth circuit means for detecting the level of the output signal of the fourth circuit means, and for producing an output signal representing the relative motion ratio between the object and the device.

7. A device for detecting the relative motion between an object and the device, comprising:
(A) image forming means for forming an image of an object;
(B) photoelectric means for producing electrical signals in response to radiation received, said photoelectric means being arranged to receive the object image formed by the image forming means; and
(C) a signal processing circuit system for receiving the electrical signals produced from the photoelectric means and providing an electrical output indicative of at least whether or not relative motion has arisen between the object and the device, and for detecting whether the position of the center of gravity of the light quantity distribution of the object image formed on the photoelectric means is displaced or not in accordance with the electrical signals produced from the photoelectric means in order to detect whether or not the relative motion has arisen between the object and the device;
(D) said signal processing circuit system including:
  (D-1) first detecting means for detecting the position of the center of gravity of the light quantity distribution of the object image formed on the photoelectric means in accordance with the electrical signals produced from the photoelectric means and for providing an output signal corresponding to the position of the center of gravity;
  (D-2) second detecting means for detecting the variation of the output signal provided by the first detecting means and for providing at least an output signal for indicating whether the position of the center of gravity is displaced or not;
(E) the photoelectric means being an image sensing means comprising an array of a plurality of photosensors each of which produces an electrical signal corresponding to the brightness of the image element of the object image, so that the first detecting means detects the position of the center of gravity of the light quantity distribution of the object image in accordance with the electrical signals produced from the photosensor;
(F) the first detecting means including:
  (F-1) first circuit means for adding different weights corresponding to the addresses in the photo-sensor to the electrical signals produced from the photo-sensors;
  (F-2) second circuit means for obtaining the total sum of all of the photo-sensors at the output signals of the first circuit means;
  (F-3) third circuit means for obtaining the total sum of the electrical signals produced from the photo-sensors; and
  (F-4) fourth circuit means for normalizing an output signal of the second circuit means with an output signal of the third circuit means so as to provide the output signal corresponding to the position of the center of gravity.

8. A device according to claim 7, wherein the second detecting means includes:
(a) fifth circuit means for delaying the output signal to be provided by the fourth circuit means for one scanning period of scanning the object image with the image sensing means;

(b) sixth circuit means for detecting the difference between an output signal of the fifth circuit means and the output signal of the fourth circuit means, and for at least indicating whether the position of the center of gravity is displaced or not.

9. A device according to claim 8, wherein the sixth circuit means is a differential circuit means for obtaining the difference between the output signals of the fourth and the fifth circuit means, and for producing an output signal whose level corresponds to the position of the center of gravity.

10. A device according to claim 9, wherein the second detecting circuit means further includes:

seventh circuit means for detecting the level of the output signal of the sixth circuit means so as to produce an output signal representing the relative motion ratio between the object and the device.

11. An exposure control system for a camera, comprising:

(A) an exposure time regulating means for regulating the exposure time of the camera;

(B) a presetting means for presetting an exposure time;

(C) a motion detecting device for detecting the relative motion rate between an object to be photographed and the camera, said device providing an electrical signal indicative of the relative motion rate;

(D) a converting means for converting the electrical signal provided by the motion detecting device into a corresponding exposure time;

(E) a selecting means for comparing the exposure time preset by the presetting means with the exposure time provided by the converting means and corresponding to the relative motion rate between the object and the camera to select either one of the exposure times which is shorter than the other;

(F) a control means for controlling the exposure time regulating means according to the selected exposure time selected by the selecting means.

12. An exposure control system according to claim 11, wherein said motion detecting device including:

(a) an image forming means for forming an image of the object;

(b) photoelectric means for producing electrical signals in response to radiation received, said photoelectric means being arranged to receive the object image formed by the image from means;

(c) a signal processing circuit system receiving the electrical signals produced from the photoelectric means and providing the electrical signal indicating of the relative motion rate between the object and the camera, said circuit system providing the electrical signal indicative of the relative motion rate between the object and the camera by detecting the displacement rate of the position of the center of gravity of the light amount distribution of the object image formed on the photoelectric means.

* * * * *